US010994634B2

(12) United States Patent
Zhang et al.

(10) Patent No.: US 10,994,634 B2
(45) Date of Patent: May 4, 2021

(54) MOTOR VEHICLE SEAT FLOOR SLIDE RAIL HAVING A GAP ELIMINATION STRUCTURE

(71) Applicant: Adient Engineering and IP GmbH, Burscheid (DE)

(72) Inventors: Jianglin Zhang, Shanghai (CN); Jiang Honghui, Shanghai (CN); He Longhui, Shanghai (CN); Yedi Fan, Shanghai (CN); Tao Huijia, Shanghai (CN)

(73) Assignee: Adient Engineering and IP GmbH, Burscheid (DE)

( * ) Notice: Subject to any disclaimer, the term of this patent is extended or adjusted under 35 U.S.C. 154(b) by 206 days.

(21) Appl. No.: 16/256,405

(22) Filed: Jan. 24, 2019

(65) Prior Publication Data

US 2019/0225116 A1 Jul. 25, 2019

(30) Foreign Application Priority Data

Jan. 25, 2018 (CN) .......................... 201810074491.2

(51) Int. Cl.
*B60N 2/015* (2006.01)
*B60N 2/07* (2006.01)
*B60N 2/08* (2006.01)

(52) U.S. Cl.
CPC ....... *B60N 2/0155* (2013.01); *B60N 2/01525* (2013.01); *B60N 2/0715* (2013.01);
(Continued)

(58) Field of Classification Search
CPC ................ B60N 2/0155; B60N 2/0887; B60N 2/01525; B60N 2/0875; B60N 2/0818; B60N 2/0715; B60N 2205/20
See application file for complete search history.

(56) References Cited

U.S. PATENT DOCUMENTS

2001/0015401 A1* 8/2001 Yoshida ............... B60N 2/0715
248/430
2002/0056799 A1* 5/2002 Fujimoto ............. B60N 2/0715
248/430

(Continued)

FOREIGN PATENT DOCUMENTS

CN 106 926 757 A 7/2017
EP 2 664 489 A1 11/2013
(Continued)

OTHER PUBLICATIONS

Japanese Patent Office, 1st Office Action in Application JP 2019-009228 dated Jan. 17, 2020, 8 pages.

*Primary Examiner* — Jason S Morrow
(74) *Attorney, Agent, or Firm* — Marshall & Melhorn, LLC

(57) ABSTRACT

A motor vehicle seat floor slide rail includes a lower slide rail assembly (100), an upper slide rail assembly (200) and a gap elimination mechanism (230, 230'), with a shaft-provided gap elimination cam (231L, 231R), on an upper slide rail longitudinal end, having a rotation center (232a) axis perpendicular to an upper rail longitudinal direction. A locking window face (117L, 117R) has an aluminum slide rail (110) longitudinal gap elimination face (113L, 113R). A rail locked state has a cam face (2311L, 2311R) in contact with the gap elimination face to eliminate a Y and Z direction gap. In a rail unlocked state, a locking mechanism (240) drives the gap elimination cam, such that the cam face loses contact with the gap elimination face. The gap elimination cam moves in linkage with the locking mechanism, reducing sliding friction, and having the advantage of low sliding assistance motive power.

8 Claims, 18 Drawing Sheets

(52) U.S. Cl.
CPC ......... *B60N 2/0818* (2013.01); *B60N 2/0875* (2013.01); *B60N 2/0887* (2013.01); *B60N 2205/20* (2013.01)

(56) References Cited

U.S. PATENT DOCUMENTS

| | | | |
|---|---|---|---|
| 2014/0110554 A1* | 4/2014 | Oya | B60N 2/0722 |
| | | | 248/430 |
| 2018/0105074 A1* | 4/2018 | Shiraki | B60N 2/0705 |
| 2018/0126875 A1* | 5/2018 | Kume | B60N 2/08 |
| 2020/0001745 A1* | 1/2020 | Shimizu | B60N 2/0818 |
| 2020/0238860 A1* | 7/2020 | Taniguchi | B60N 2/0727 |

FOREIGN PATENT DOCUMENTS

| | | |
|---|---|---|
| JP | H10100752 A | 4/1998 |
| JP | H10230762 A | 9/1998 |
| JP | 2002283888 A | 10/2002 |
| JP | 2016030520 A | 3/2016 |
| WO | 2014/049651 A1 | 4/2014 |

\* cited by examiner understand# MOTOR VEHICLE SEAT FLOOR SLIDE RAIL HAVING A GAP ELIMINATION STRUCTURE

CROSS REFERENCE TO RELATED APPLICATIONS

This application claims the benefit of priority under 35 U.S.C. § 119 of China Application 201810074491.2, filed Jan. 25, 2018, the entire contents of which are incorporated herein by reference.

TECHNICAL FIELD

The present invention relates to the technical field of motor vehicle components, especially to a manually adjustable floor slide rail for large-travel sliding of a motor vehicle seat, and in particular to a motor vehicle seat floor slide rail having a gap elimination structure, which has a self-locking property and a gap elimination function which operates in linkage with a locking system.

BACKGROUND

With the development of motor vehicle technology and more exacting demands from consumers regarding motor vehicle comfort, accompanied by dramatic growth in sales of large-space vehicle types with multiple rows of seats such as multi-purpose vehicles (short MPVs) in recent years, as well as the development of driverless motor vehicles of the future, market demand for large-travel adjustment of motor vehicle seats and a common rail for multiple rows of seats is set to become a trend; hence, the development of large-travel floor slide rail technology is also in conformity with market demand. However, large-travel floor slide rail technology is different from conventional short slide rail technology. The unique application field and ultra-long adjustment travel thereof restrict the unique structure thereof, and also place new performance demands on the floor slide rail.

At present, the principal techniques for gap elimination in large-travel floor slide rails are as follows: one technique is to use an interactive plastic member which moves in linkage with unlocking to eliminate gaps; a second technique is to use a composite spring together with a V-shaped wheel to eliminate gaps; and a third technique is to use a plastic member directly to eliminate gaps. However, all of these gap elimination solutions fall short of being ideal.

SUMMARY

A technical problem to be solved by the present invention is to provide, in response to the shortcomings of gap elimination in existing large-travel floor slide rails, a motor vehicle seat floor slide rail having a gap elimination structure, which has a self-locking property and a gap elimination function which operates in linkage with a locking system.

The technical problem to be solved by the present invention may be realized through the following technical solution:

A motor vehicle seat floor slide rail having a gap elimination structure comprises a lower slide rail assembly and an upper slide rail assembly, wherein the lower slide rail assembly comprises an aluminum slide rail comprising at least one locking window face extending in a longitudinal direction of the aluminum slide rail, with a number of lower slide rail locking windows being provided at intervals on the locking window face in the longitudinal direction of the aluminum slide rail. The upper slide rail assembly comprises an upper slide rail and a locking mechanism mounted on the upper slide rail, a number of upper slide rail locking windows are provided at intervals on the upper slide rail in a longitudinal direction of the upper slide rail, locking teeth on a locking plate in the locking mechanism are respectively inserted into the upper slide rail locking windows and the lower slide rail locking windows, realizing locking of the upper slide rail assembly to the lower slide rail assembly, and at the same time eliminating an X-direction gap between the upper slide rail assembly and the lower slide rail assembly, wherein when unlocking is carried out, the locking teeth on the locking plate in the locking mechanism withdraw from the lower slide rail locking windows, and after unlocking, the upper slide rail assembly moves reciprocally on the aluminum slide rail in the longitudinal direction of the aluminum slide rail; characterized in that at least one gap elimination mechanism is further included, the gap elimination mechanism comprising a gap elimination cam which is shaft-provided on at least one end in the longitudinal direction of the upper slide rail, with a rotation center axis of the gap elimination cam being perpendicular to the longitudinal direction of the upper slide rail; a gap elimination face extending in the longitudinal direction of the aluminum slide rail is provided on a bottom face of the locking window face on the aluminum slide rail, and when the upper slide rail assembly and the lower slide rail assembly are in a locked state, a cam face of the gap elimination cam is in contact with the gap elimination face under the action of a force, to eliminate a Y-direction gap and a Z-direction gap between the upper slide rail assembly and the lower slide rail assembly; and in an unlocked state, the locking mechanism drives an action of the gap elimination cam, such that the cam face of the gap elimination cam loses contact with the gap elimination face.

A motor vehicle seat floor slide rail having a gap elimination structure comprises a lower slide rail assembly and an upper slide rail assembly, wherein the lower slide rail assembly comprises an aluminum slide rail comprising at least one locking window face extending in a longitudinal direction of the aluminum slide rail, with a number of lower slide rail locking windows being provided at intervals on the locking window face in the longitudinal direction of the aluminum slide rail. The upper slide rail assembly comprises an upper slide rail and a locking mechanism mounted on the upper slide rail. A number of upper slide rail locking windows are provided at intervals on the upper slide rail in a longitudinal direction of the upper slide rail. Furthermore locking teeth on a locking plate in the locking mechanism are respectively inserted into the upper slide rail locking windows and the lower slide rail locking windows, realizing locking of the upper slide rail assembly to the lower slide rail assembly, and at the same time eliminating an X-direction gap between the upper slide rail assembly and the lower slide rail assembly. When an unlocking is carried out, the locking teeth on the locking plate in the locking mechanism withdraw from the lower slide rail locking windows, and after unlocking, the upper slide rail assembly moves reciprocally on the aluminum slide rail in the longitudinal direction of the aluminum slide rail. At least one gap elimination mechanism is further included, the gap elimination mechanism comprising a gap elimination cam which is shaft-provided on at least one end in the longitudinal direction of the upper slide rail, with a rotation center axis of the gap elimination cam being perpendicular to the longitudinal direction of the upper slide rail. To eliminate a Y-direction gap and a Z-direction gap between the upper slide rail assembly and the lower slide rail assembly is the gap elimination mechanism engageable with one of the ends of the locking mechanism and with the upper slide rail assembly, wherein a driver drives the gap elimination mechanism to engage with the lower rail in a locked state of the rail assembly. The driver can be formed as a spring, in particular as a gap elimination spring.

In a preferred embodiment of the present invention to perform an unlocking of the upper slide rail assembly and the lower slide rail assembly the gap elimination mechanism is engageable with one of the ends of the locking mechanism when the locking plate is moved downwards wherein the locking mechanism drives the gap elimination mechanism to disengage with the lower rail assembly. Therefore a sliding of the upper slide rail assembly is facilitated.

In a further preferred embodiment of the present invention, two gap elimination mechanisms are included, wherein one gap elimination mechanism is positioned at a first end of the upper slide rail assembly and one another gap elimination mechanism is positioned at a second end of the upper slide rail assembly. So a Y-direction gap and a Z-direction gap between the upper slide rail assembly and the lower slide rail assembly will be eliminated at each side of the slide rail assembly.

In a preferred embodiment of the present invention, the cam face on the gap elimination cam has a circular arc cam face section; a circle center of the circular arc cam face is offset from a rotation center of the gap elimination cam towards the locking mechanism; and a self-locking angle is formed between a line connecting the rotation center of the gap elimination cam to a point of contact between the circular arc cam face and the gap elimination face, and a line connecting the circle center of the circular arc cam face to the point of contact between the circular arc cam face and the gap elimination face.

In a preferred embodiment of the present invention, a cross section, along the rotation center axis parallel to the gap elimination cam, of the cam face on the gap elimination cam is a V-shaped surface or a flat surface or a protruding spherical surface.

In a preferred embodiment of the present invention, the gap elimination mechanism further comprises a cam frame and a gap elimination spring, with the gap elimination cam being mounted on the cam frame, the cam frame being shaft-provided on at least one end in the longitudinal direction of the upper slide rail, and a rotation center of the cam frame coinciding with the rotation center of the gap elimination cam; the cam frame has a cam drive arm extending towards the locking mechanism, and an end of the cam drive arm close to the locking mechanism extends to a region below the locking plate in the locking mechanism, and when unlocking is carried out, the locking plate in the locking mechanism, when moving downwards, drives the end of the cam drive arm close to the locking mechanism to move downwards, such that the cam face of the gap elimination cam loses contact with the gap elimination face; the cam drive arm is connected to the upper slide rail by means of the gap elimination spring, and the gap elimination spring applies a said force to the cam face of the gap elimination cam by means of the cam drive arm, such that the cam face of the gap elimination cam is in contact with the gap elimination face.

In a preferred embodiment of the present invention, the gap elimination mechanism further comprises a cam frame and a gap elimination spring and a swing rod, with the gap elimination cam being mounted on the cam frame, the cam frame being shaft-provided on at least one end in the longitudinal direction of the upper slide rail, and a rotation center of the cam frame coinciding with the rotation center of the gap elimination cam; the cam frame has a cam drive arm extending towards the locking mechanism, and the cam drive arm is provided with an obround hole; the swing rod is shaft-provided on the upper slide rail and positioned between the cam drive arm and one end of the locking plate in the locking mechanism; a swing rod drive shaft is provided on the end of the swing rod close to the cam drive arm, with the swing rod drive shaft extending into the obround hole of the cam drive arm, and an end of the swing rod close to the locking mechanism extends to a region below the locking plate in the locking mechanism, and when unlocking is carried out, the locking plate in the locking mechanism, when moving downwards, drives the end of the swing rod close to the locking mechanism to move downwards, such that the end of the swing rod close to the cam drive arm moves upwards, in turn causing the cam face of the gap elimination cam to lose contact with the gap elimination face by means of the cam drive arm; the swing rod is connected to the upper slide rail by means of the gap elimination spring, and the gap elimination spring applies a said force to the cam face of the gap elimination cam by means of the swing rod and the cam drive arm, such that the cam face of the gap elimination cam is in contact with the gap elimination face; compared with a position where the swing rod is shaft-provided on the upper slide rail, a position where the gap elimination spring is connected to the swing rod is closer to the locking mechanism.

Due to the adoption of the technical solution described above, the present invention has the following advantages compared with the prior art:

(1) It has the locking mechanism eliminating gaps in the X-direction, and the gap elimination cam eliminating gaps in the Y-direction and the Z-direction, so that there are no gaps between the upper and lower slide rails in the X-, Y- and Z-directions.

(2) A self-locking function of the gap elimination cam is used to achieve self-locking between the cam face on the gap elimination cam and the gap elimination face on the lower slide rail.

(3) The gap elimination cam of the present invention moves in linkage with the locking mechanism, reducing sliding friction, and having the advantage of low sliding assistance motive power.

(4) The present invention may be applied to different vehicle types, with rail types being changed over at very low cost.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
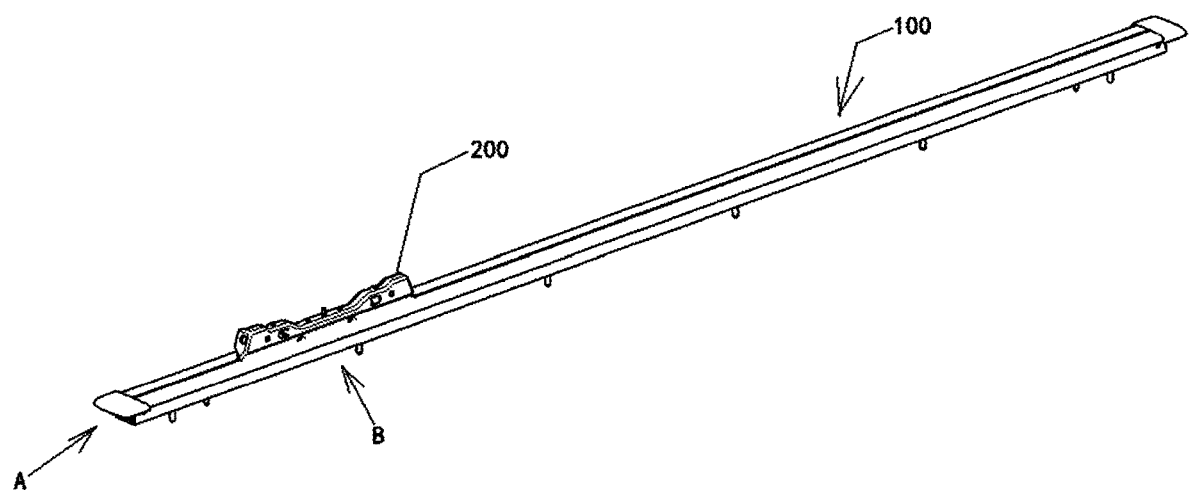
FIG. 1 is a schematic perspective view of the external form of a motor vehicle seat floor slide rail having a gap elimination structure of the present invention.
Figure 2:
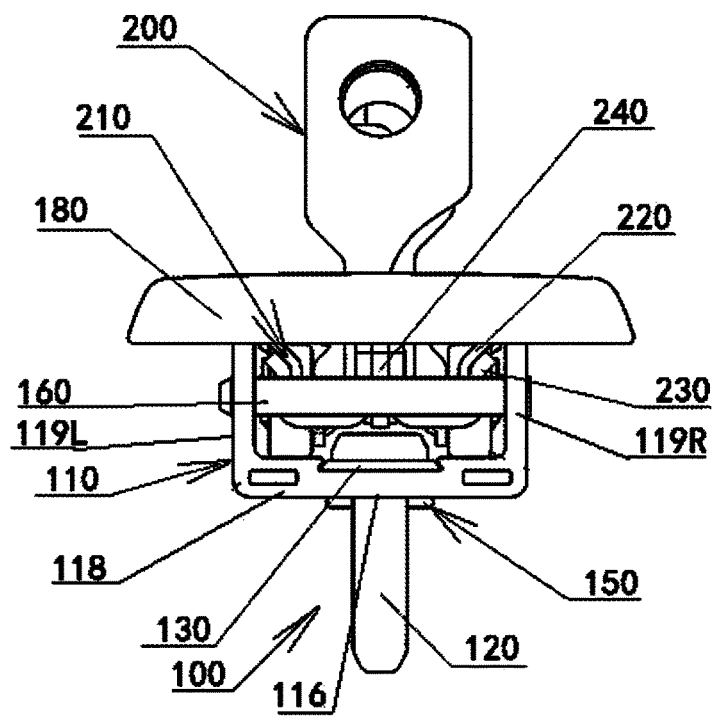
FIG. 2 is a schematic end view of the motor vehicle seat floor slide rail in direction A of FIG. 1.
Figure 3:
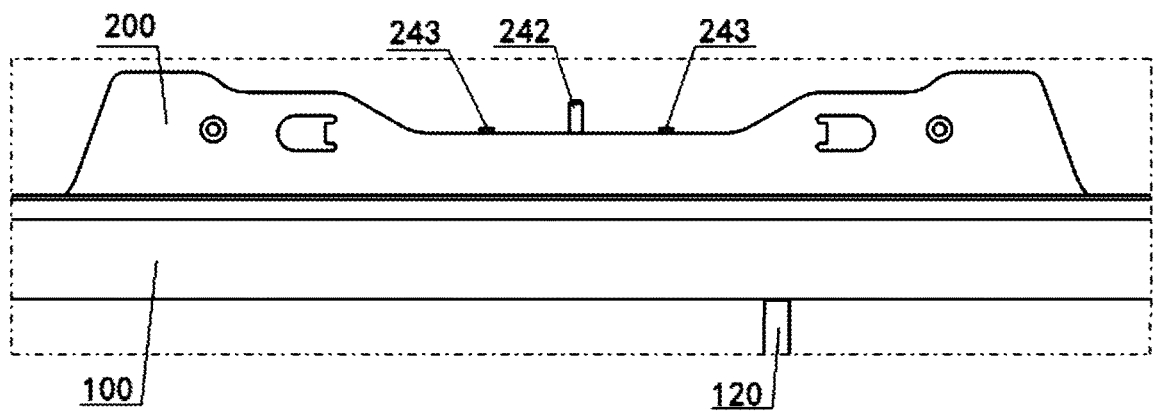
FIG. 3 is a partial schematic side view of the motor vehicle seat floor slide rail in direction B of FIG. 1.
Figure 4:
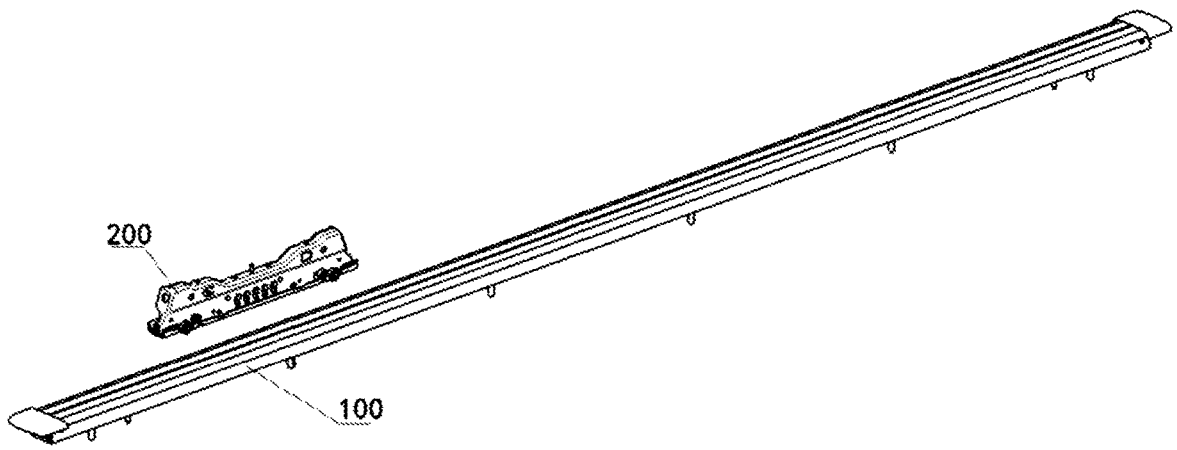
FIG. 4 is an exploded schematic diagram of a motor vehicle seat floor slide rail having a gap elimination structure of the present invention.
Figure 5:
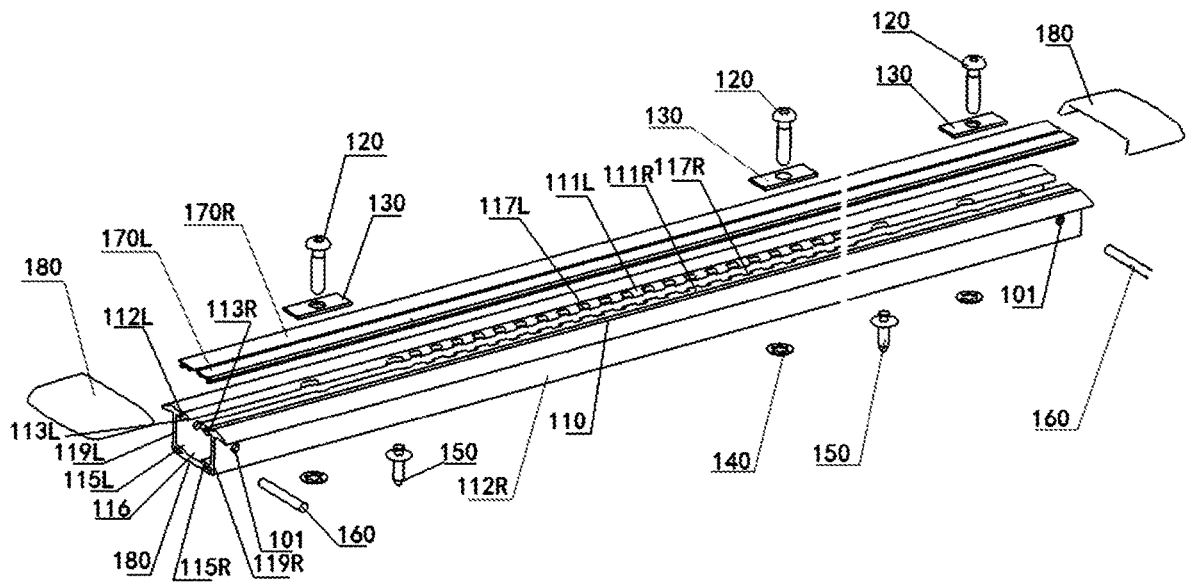
FIG. 5 is an exploded schematic view of a lower slide rail assembly in a motor vehicle seat floor slide rail having a gap elimination structure of the present invention.

Referring to the drawings, and in particular to FIGS. 1 to 25, a motor vehicle seat floor slide rail having a gap elimination structure shown in the figures comprises a lower slide rail assembly 100 and an upper slide rail assembly 200, wherein: referring to FIG. 5 in particular, the lower slide rail assembly 100 comprises an aluminum slide rail 110, three bolts 120, three washers 130, three paper washers 140, two locating pins 150, two end stop pins 160, a left soft trim strip 170L, a right soft trim strip 170R and two end caps 180.

The aluminum slide rail 110 has a total length of 2420 mm and an adjustment step length of 20 mm. A corresponding maximum locking adjustment travel can reach 2000 mm, and the specific application length is adjusted, being increased or decreased, according to the project environment. A surface of the aluminum slide rail 110 can serve as an exterior surface after undergoing surface treatment (such as anodizing).

Figure 6:
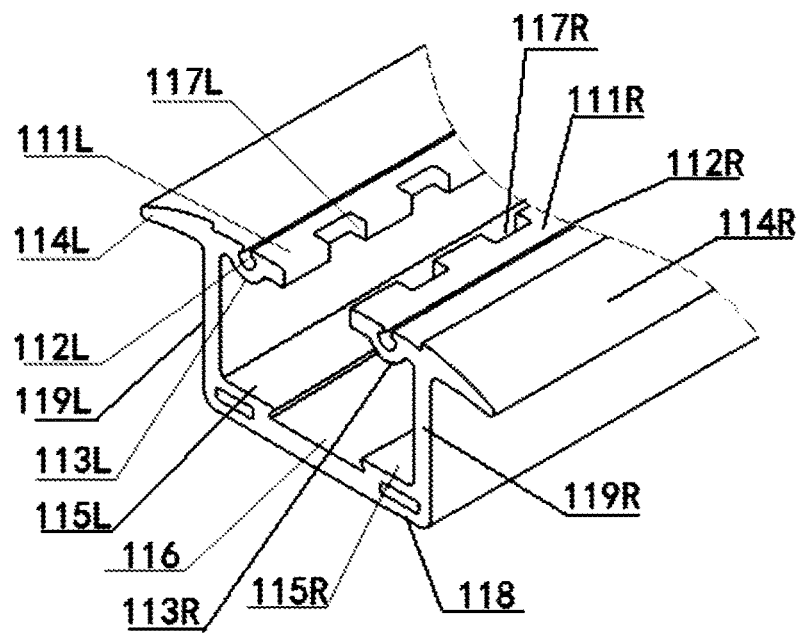
FIG. 6 is a schematic perspective view of an end of an aluminum slide rail in a lower slide rail assembly of the present invention.
Figure 7:
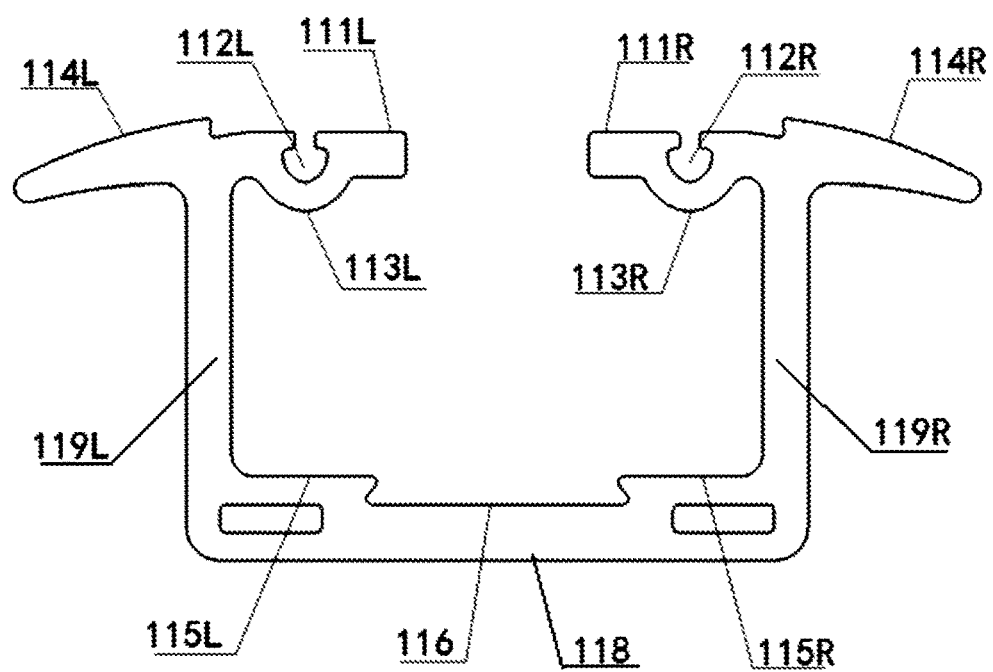
FIG. 7 is a schematic end view of a radial cross section of an aluminum slide rail in a lower slide rail assembly of the present invention.
Figure 8:
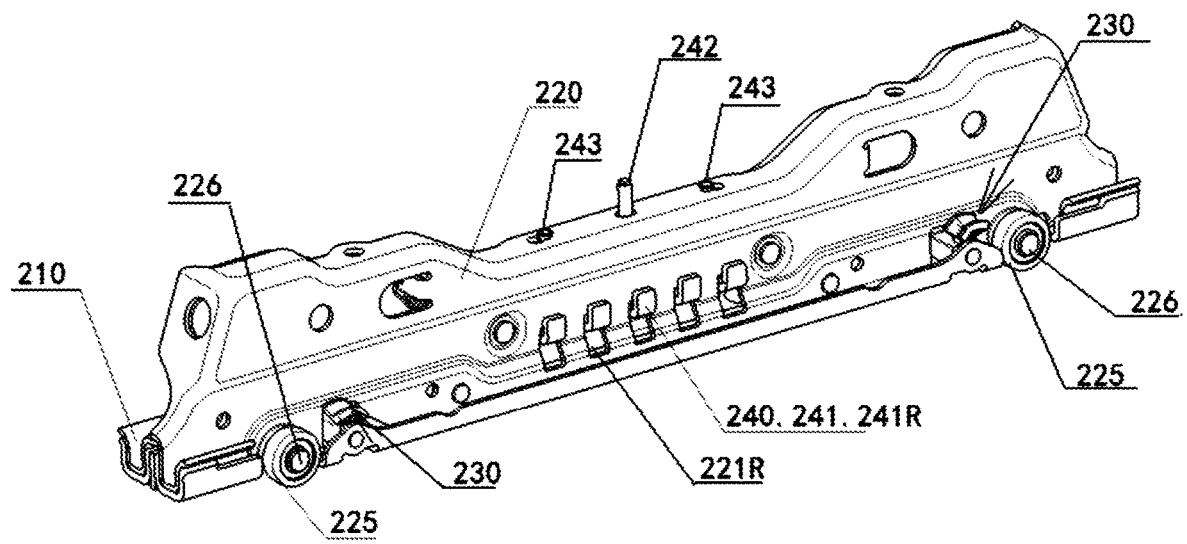
FIG. 8 is a structural schematic perspective view of an upper slide rail assembly in a motor vehicle seat floor slide rail having a gap elimination structure of the present invention.
Figure 9:
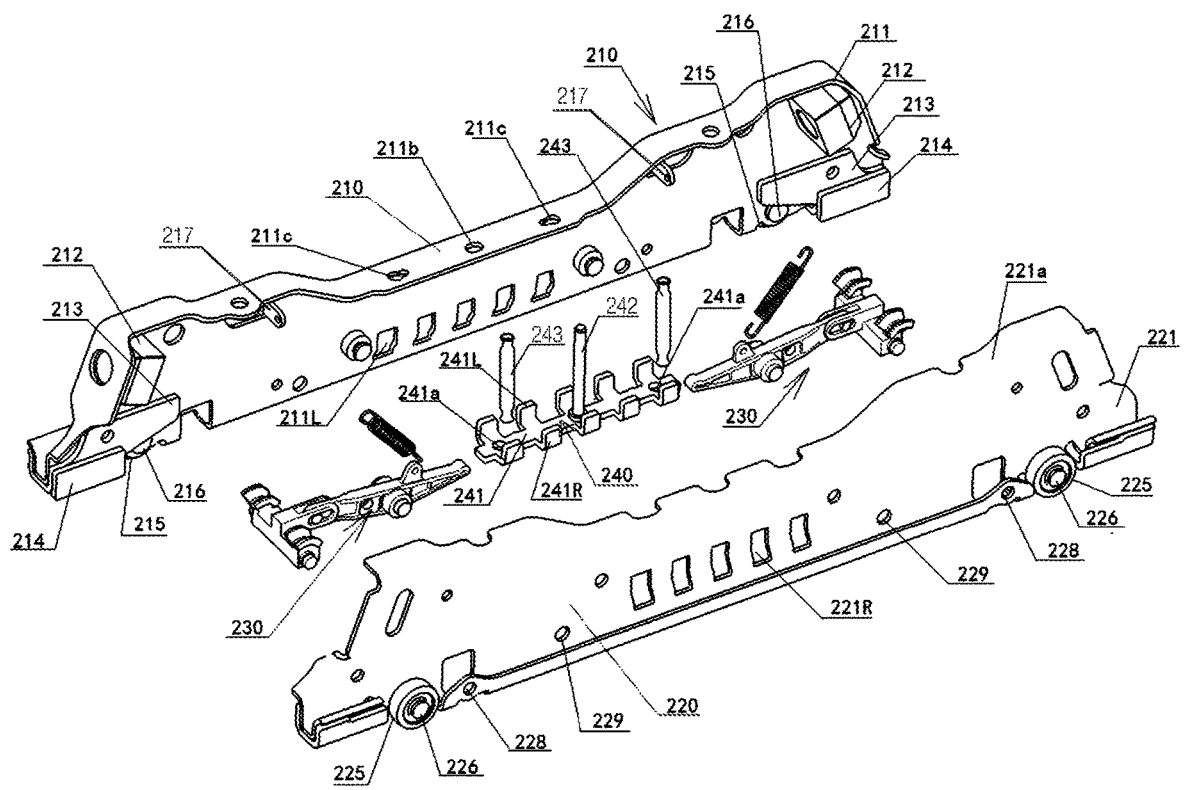
FIG. 9 is an exploded schematic perspective view of an upper slide rail assembly in a motor vehicle seat floor slide rail having a gap elimination structure of the present invention.
Figure 10:
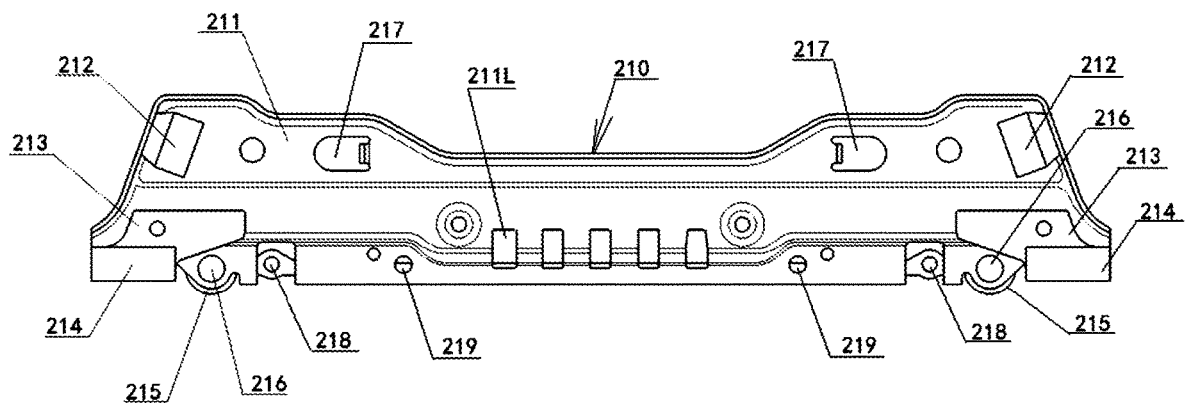
FIG. 10 is a left-side schematic assembly view of an upper slide rail in an upper slide rail assembly of the present invention.
Figure 11:
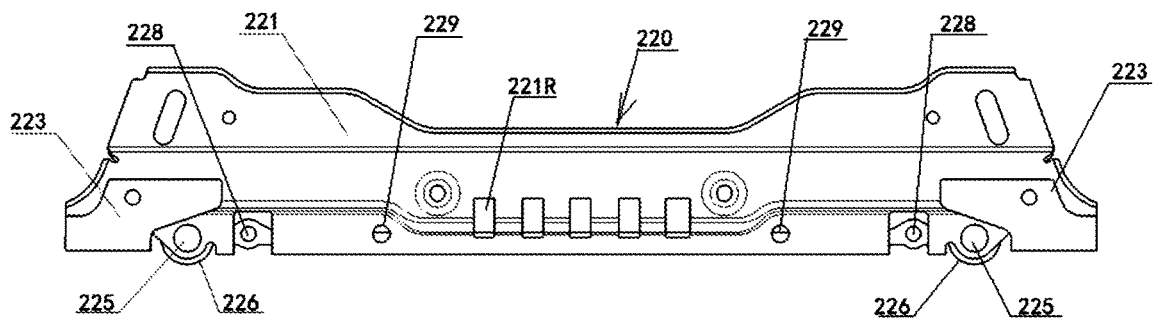
FIG. 11 is a right-side schematic assembly view of an upper slide rail in an upper slide rail assembly of the present invention.
Figure 12:
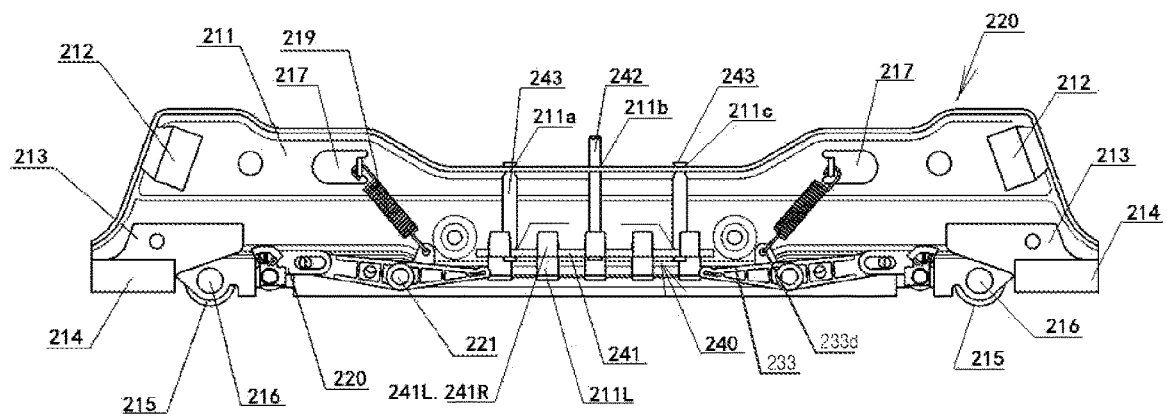
FIG. 12 is a side view of the internal structure of an upper slide rail assembly of the present invention.
Figure 13:
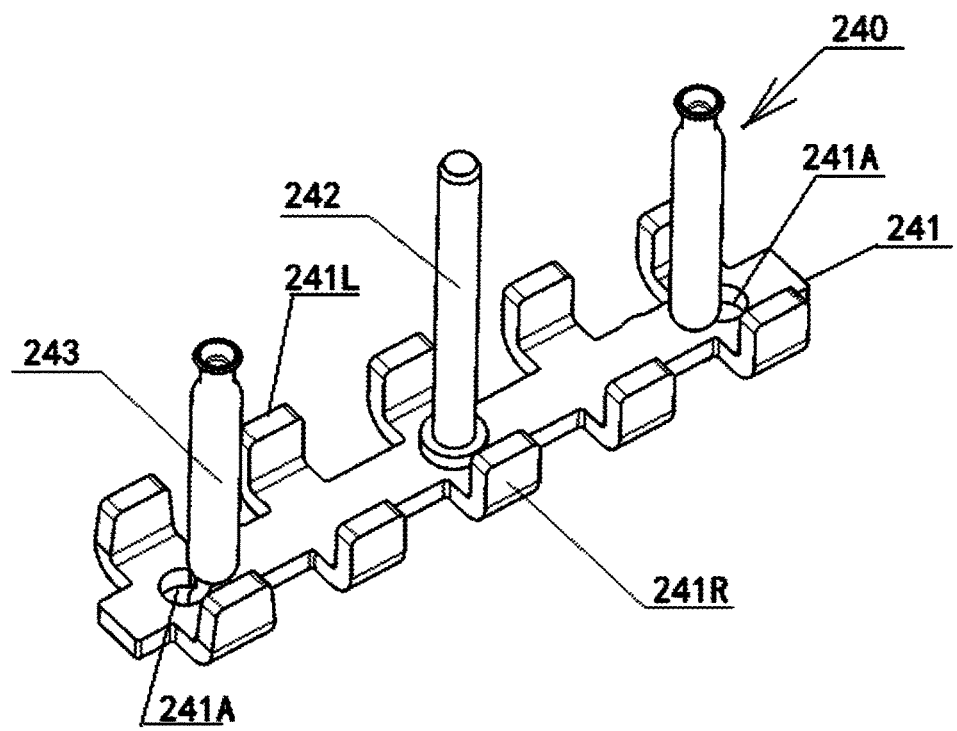
FIG. 13 is a structural schematic perspective view of a locking mechanism of the present invention.
Figure 14:
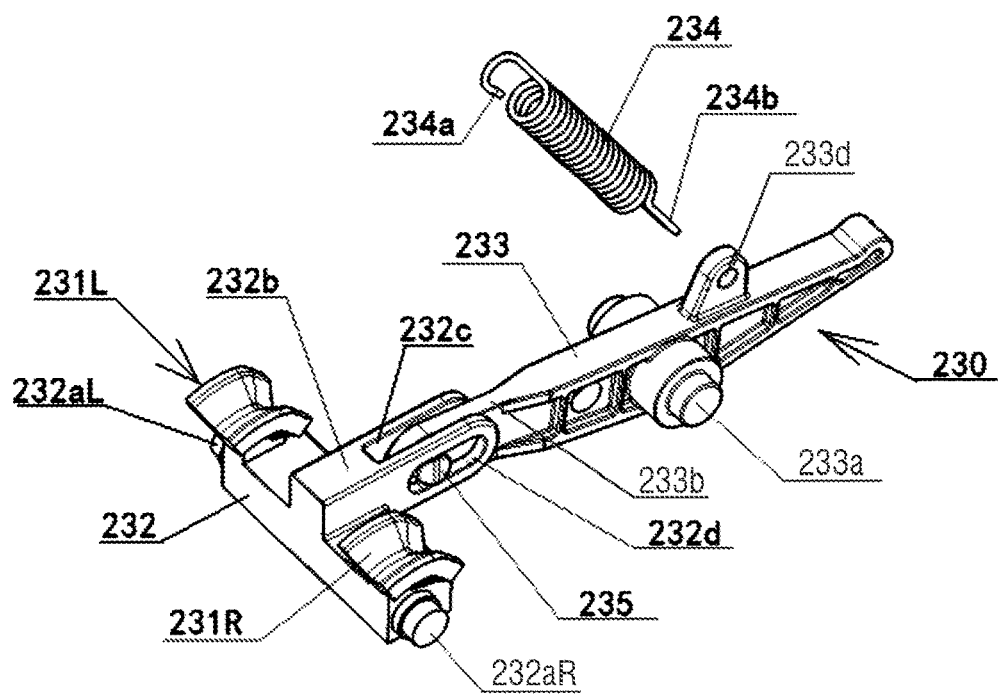
FIG. 14 is a structural schematic perspective view of a gap elimination mechanism of the present invention.
Figure 15:
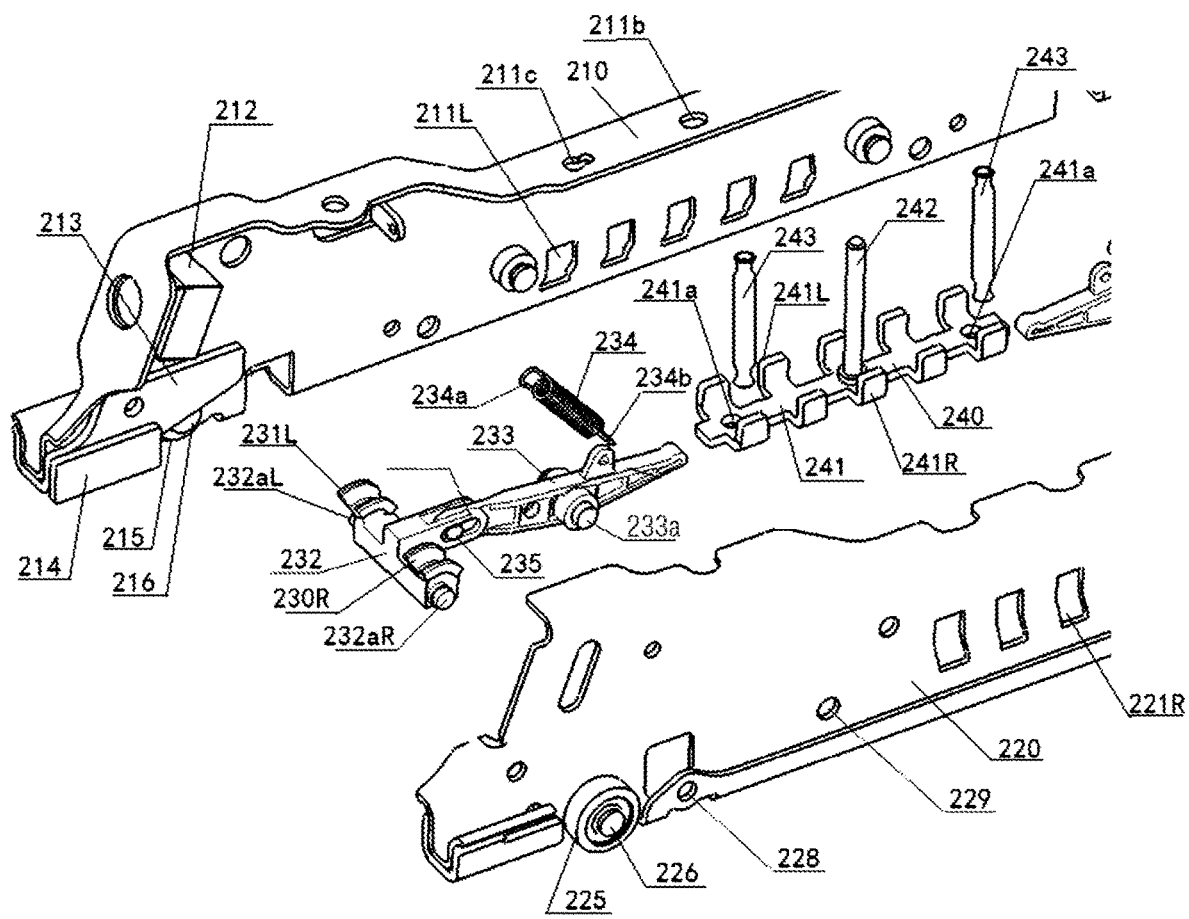
FIG. 15 is an exploded schematic perspective view of an upper slide rail of the present invention.
Figure 16:
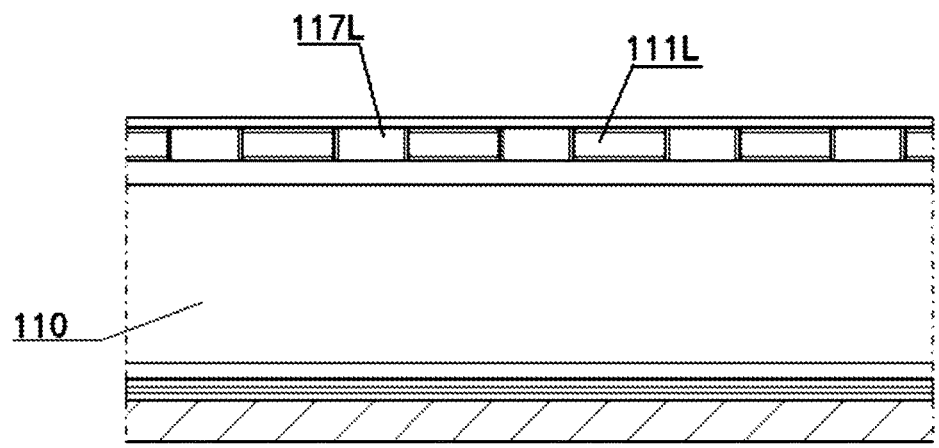
FIG. 16 is a schematic view of locking windows in an aluminum slide rail of the present invention.
Figure 17:
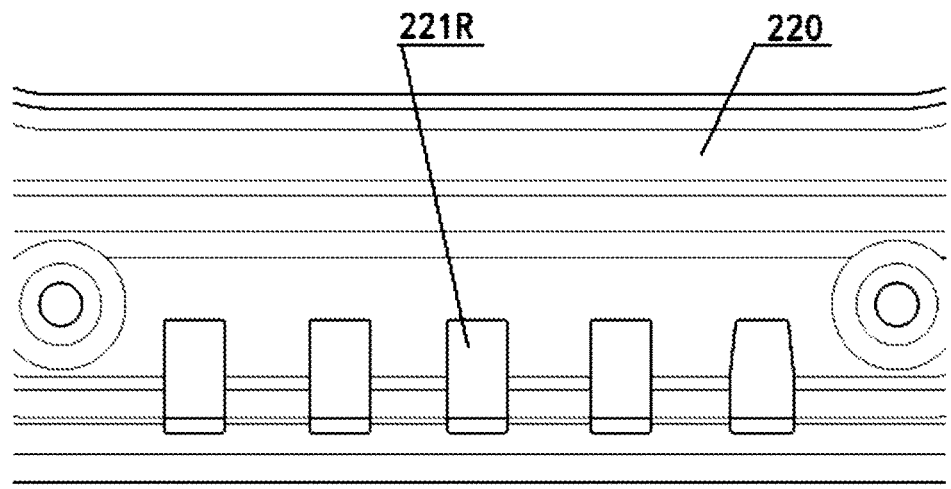
FIG. 17 is a schematic view of locking windows of an upper slide rail of the present invention.
Figure 18:
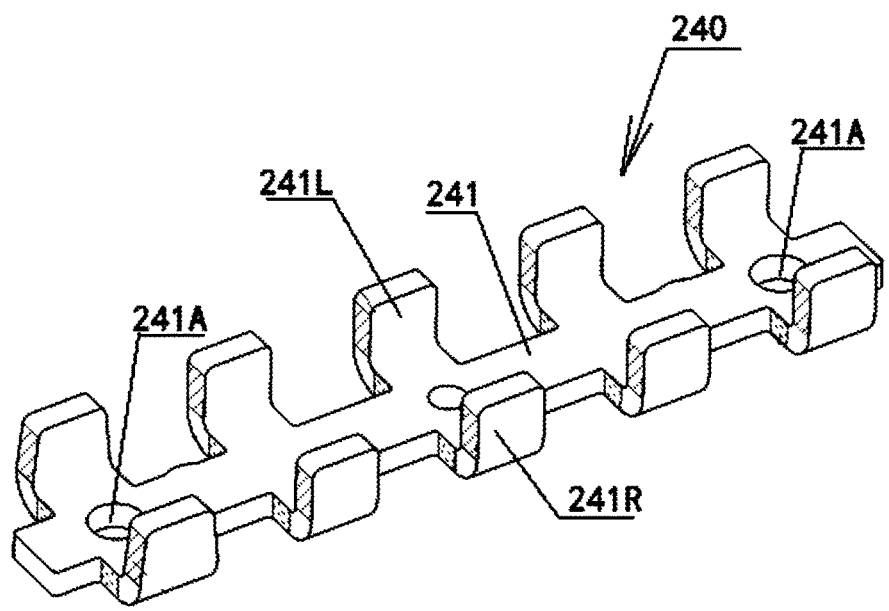
FIG. 18 is a structural schematic perspective view of a locking plate of the present invention.
Figure 19:
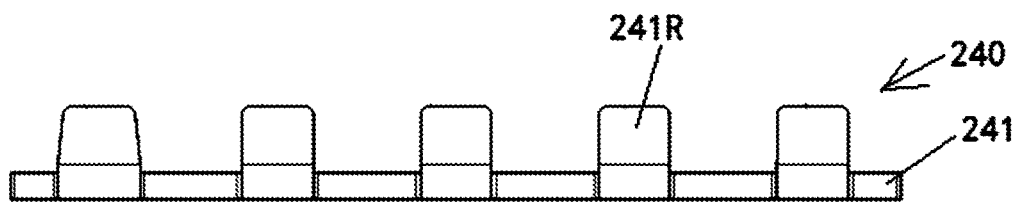
FIG. 19 is a structural schematic view of locking teeth on a locking plate of the present invention.

Referring to FIGS. 6 and 7 in particular, a cross section of the aluminum slide rail 110 perpendicular to a longitudinal direction thereof has a U-shaped structure formed by a bottom wall 118 and left and right sidewalls 119L and 119R. A left locking window face 111L and a right locking window face 111R are provided at top inside edges of the left and right sidewalls 119L and 119R respectively. A left carpet-pressing folded edge 114L and a right carpet-pressing folded edge 114R are provided at top outside edges of the left sidewall 119L and the right sidewall 119R respectively. The left sidewall 119L, the left locking window face 111L and the left carpet-pressing folded edge 114L are integrally formed. The right sidewall 119R, the right locking window face 111R and the right carpet-pressing folded edge 114R are also integrally formed.

A number of lower left locking windows 117L and lower right locking windows 117R are provided at intervals at inner edges of the left locking window face 111L and the right locking window face 111R respectively in the longitudinal direction of the aluminum slide rail 110. A left soft trim strip fixing groove 112L and a right soft trim strip fixing groove 112R extending in the longitudinal direction of the aluminum slide rail 110 are provided on top faces of the left locking window face 111L and the right locking window face 111R respectively. A left gap elimination face 113L and a right gap elimination face 113R extending in the longitudinal direction of the aluminum slide rail 110 are provided on bottom faces of the left locking window face 111L and the right locking window face 111R respectively.

A slide rail mounting face 116, a left bearing rolling face 115L and a right bearing rolling face 115R extending in the longitudinal direction of the aluminum slide rail 110 are provided on an inner surface of the bottom wall 118 of the aluminum slide rail 110. The slide rail mounting face 116 is located between the left bearing rolling face 115L and the right bearing rolling face 115R.

When mounting is carried out, the left soft trim strip 170L and the right soft trim strip 170R are mounted in the left soft trim strip fixing groove 112L and the right soft trim strip fixing groove 112R respectively the left carpet-pressing folded edge 114L and the right carpet-pressing folded edge 114R are used to press down on a vehicle interior carpet on the left and right sides of the aluminum slide rail 110 respectively.

The two locating pins 150 are on the bottom wall 118 of the aluminum slide rail 110, and are used for locating in a forward-rear direction when the aluminum slide rail 110 is mounted to a vehicle body bottom plate. Before the locating pins 150 are riveted, all of the washers 130 must be inserted into the slide rail mounting face 116 on the bottom wall 118 of the aluminum slide rail 110, and the three bolts 120 are passed through the corresponding washers 130, the bottom wall 118 of the aluminum slide rail 110 and the slide rail mounting face 116 thereon, and connected to the paper washers 140 located on a bottom surface of the bottom wall 118 of the aluminum slide rail 110.

Once the upper slide rail assembly 200 has been fitted into the aluminum slide rail 110, the two end stop pins 160 are inserted into stop pin holes 101 at two ends in the longitudinal direction of the aluminum slide rail 110 respectively; finally, the two end caps 180 are fitted to the two ends in the longitudinal direction of the aluminum slide rail 110, and the upper slide rail assembly 200 slides forwards and backwards on the aluminum slide rail 110, forming a motor vehicle seat floor slide rail having a gap elimination structure of the present invention.

Referring to FIGS. 8 to 19 in particular, the upper slide rail assembly 200 comprises an upper rail left side assembly 210 and an upper rail right side assembly 220 which are welded together to form an upper slide rail, and also comprises two gap elimination mechanisms 230 and a locking mechanism 240.

The upper rail left side assembly 210 comprises an upper rail left side plate 211 and, welded to two ends in the longitudinal direction of the upper rail left side plate 211, two left welded nuts 212, two left reinforcing plates 213 and two left support plates 214; a left plastic-coated bearing 215 is shaft-provided by means of a left bearing rivet 216 at each of the two ends in the longitudinal direction of the upper rail left side plate 211. Five upper left slide rail locking windows 211L are provided at intervals in the longitudinal direction of the upper rail left side plate 211, in a middle position of the upper rail left side plate 211. An unlocking pin guide hole 211b and two locking spring hanging holes 211c are provided in a top face of the upper rail left side plate 211.

Furthermore, two spring hanging plates 217 are provided on the upper rail left side plate 211, with the five upper left slide rail locking windows 211L being located between the two spring hanging plates 217.

The upper rail right side assembly 220 comprises an upper rail right side plate 221, and right reinforcing plates 223 welded to two ends in the longitudinal direction of the upper rail right side plate 221; a right plastic-coated bearing 225 is shaft-provided by means of a right bearing rivet 226 at each of the two ends in the longitudinal direction of the upper rail right side plate 221. Five upper right slide rail locking windows 221R are provided at intervals in the longitudinal direction of the upper rail right side plate 221, in a middle position of the upper rail right side plate 221.

The locking mechanism 240 comprises a locking plate 241, an unlocking pin 242 and two locking springs 243. On left and right side edges of the locking plate 241, five left locking teeth 241L and five right locking teeth 241R are provided at intervals in the longitudinal direction of the locking plate 241.

A lower end of the unlocking pin 242 is anchored to a middle position of the locking plate 241, and a locking spring hanging hole 241a is provided at each of two ends in the longitudinal direction of the locking plate 241.

Each gap elimination mechanism 230 comprises a left gap elimination cam 231L, a right gap elimination cam 231R, a cam frame 232, a swing rod 233 and a gap elimination spring 234, with the left gap elimination cam 231L and the right gap elimination cam 231R being disposed at left and right ends of the cam frame 232 and integrally formed with the cam frame 232. A left cam rotation shaft 232aL and a right cam rotation shaft 232aR are provided on end faces at the left and right ends of the cam frame 232 respectively.

A cam drive arm 232b is provided in a middle position of the cam frame 232, with a U-shaped slot 232c being provided at one end of the cam drive arm 232b, said end being close to the swing rod 233, and arms on two sides of the U-shaped slot 232c are each provided with an obround hole 232d of identical shape.

A swing rod rotation shaft 233a is provided in a middle position of the swing rod 233, which has a first end 233b and a second end 233c; a spring hanging hole 233d is provided in the middle of the swing rod 233, in a position offset towards the second end 233c. The first end 233b of the swing rod 233 is inserted into the U-shaped slot 232c of the cam drive arm 232b, then a swing rod drive shaft 235 is passed through the obround holes 232d in the arms on the two sides of the U-shaped slot 232c and through the first end of the swing rod 233, such that the first end 233b of the swing rod 233 is hinged to the cam drive arm 232b.

The method of assembling the upper slide rail assembly 200 is as follows: first of all, the locking mechanism 240 and the two gap elimination mechanisms 230 are mounted to the upper rail left side plate 211, specifically: the left locking teeth 241L on the left side edge of the locking plate 241 in the locking mechanism 240 are inserted into the corresponding upper left slide rail locking windows 211L in the upper rail left side plate 211 respectively, then an upper end of the unlocking pin 242 is passed through the unlocking pin guide hole 211b in the top face of the upper rail left side plate 211, then lower ends of the two locking springs 243 are hung in the two locking spring hanging holes 241a in the locking plate 241 respectively, and upper ends of the two locking springs 243 are hung in the two locking spring hanging holes 211c in the top face of the upper rail left side plate 211.

Next, the left cam rotation shafts 232aL at the left ends of the cam frames 232 in the two gap elimination mechanisms 230 are inserted into left cam rotation shaft holes 218 at the two ends of the upper rail left side plate 211 respectively, and left ends of the swing rod rotation shafts 233a on the swing rods 233 in the two gap elimination mechanisms 230 are inserted into left swing rod rotation shaft holes 219 in the upper rail left side plate 211.

Next, upper ends 234a of the gap elimination springs 234 in the two gap elimination mechanisms 230 are hooked onto the two spring hanging plates 217 respectively, and lower ends 234b of the gap elimination springs 234 are hooked into the spring hanging holes 233d on the swing rods 233 in the two gap elimination mechanisms 230. Once the two gap elimination mechanisms 230 have been assembled, the second ends 233c of the swing rods 233 in the two gap elimination mechanisms 230 are located below the two ends in the longitudinal direction of the locking plate 241 respectively.

Next, the upper rail left side plate 211 is fastened to the upper rail right side plate 221 at the same time inserting the right locking teeth 241R on the right side edge of the locking plate 241 in the locking mechanism 240 into the corresponding upper right slide rail locking windows 221R in the upper rail right side plate 221 respectively, inserting the right cam rotation shafts 232aR at the right ends of the cam frames 232 in the two gap elimination mechanisms 230 into right cam rotation shaft holes 228 at the two ends of the upper rail right side plate 221 respectively, and inserting right ends of the swing rod rotation shafts 233a on the swing rods 233 in the two gap elimination mechanisms 230 into right swing rod rotation shaft holes 229 in the upper rail right side plate 221.

Figure 20:
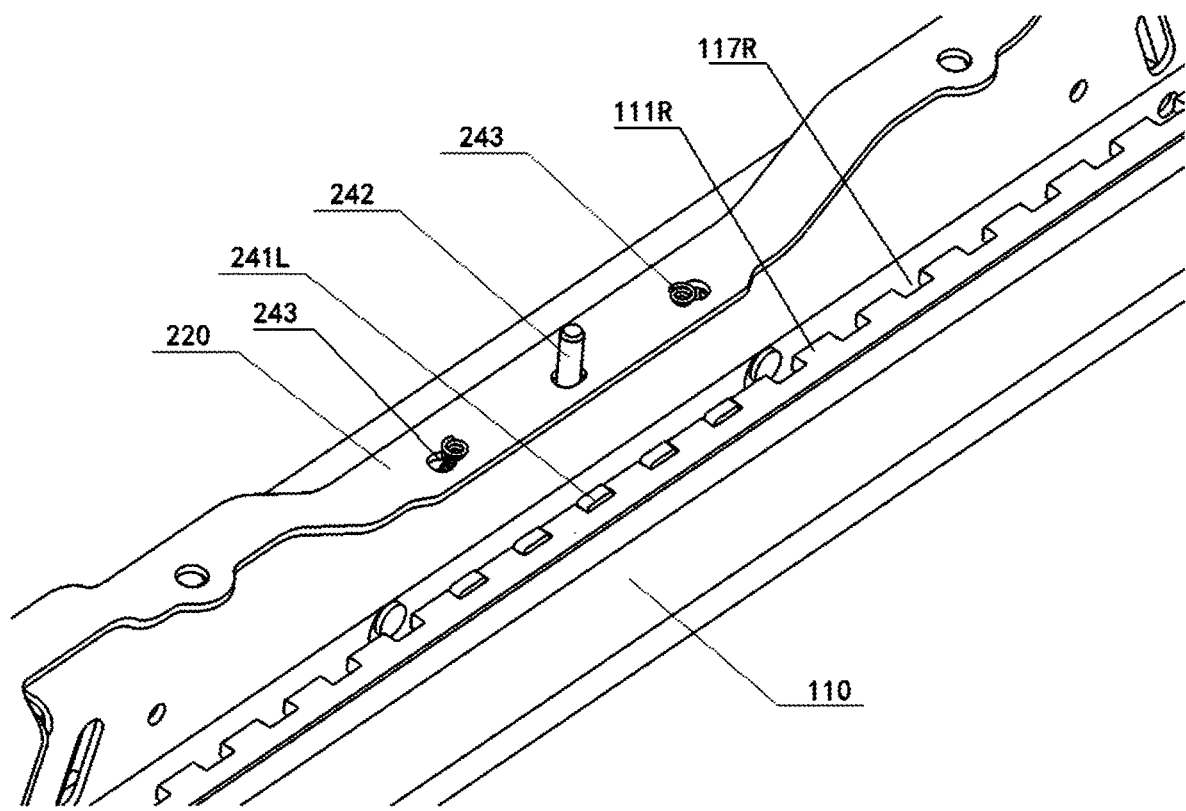
FIG. 20 is a schematic perspective view of an upper slide rail and an aluminum slide rail of the present invention in a locked state.
Figure 21:
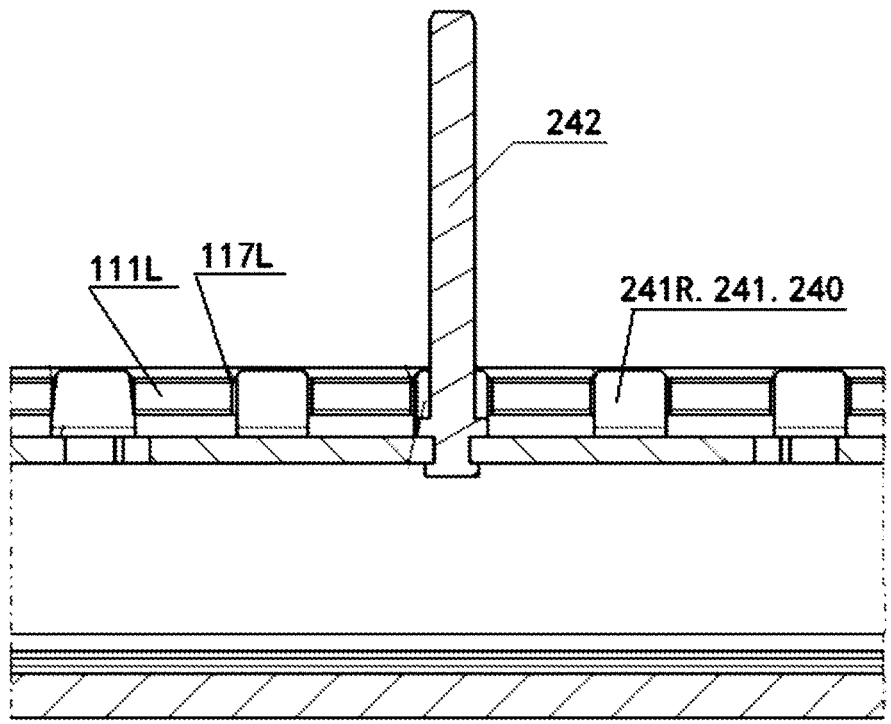
FIG. 21 is a schematic sectional view of locking teeth on a locking plate locked to locking windows on an aluminum slide rail in the present invention.
Figure 22:
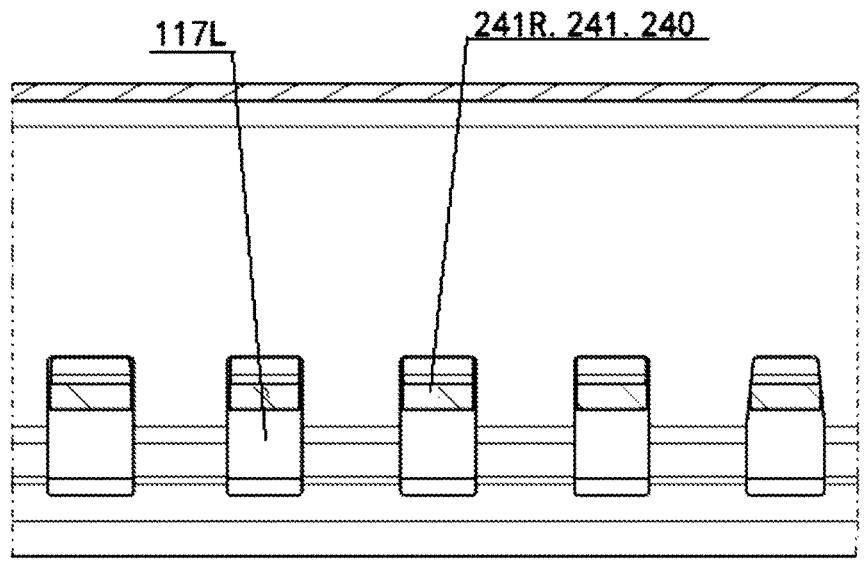
FIG. 22 is a schematic sectional view of locking teeth on a locking plate locked to locking windows on an upper slide rail in the present invention.

Referring to FIGS. 20 to 22 in particular, once the upper slide rail assembly 200 has been fitted into the aluminum slide rail 110, the five left locking teeth 241L on the left side edge of the locking plate 241 in the locking mechanism 240 respectively pass through the corresponding upper left slide rail locking windows 211L in the upper rail left side plate 211 and five corresponding left lower locking windows 117L in the left locking window face 111L of the aluminum slide rail 110, and the five right locking teeth 241R on the right side edge of the locking plate 241 in the locking mechanism 240 respectively pass through the corresponding upper right slide rail locking windows 221R in the upper rail right side plate 221 and five corresponding right lower locking windows 117R in the right locking window face 111R of the aluminum slide rail 110, such that locking is achieved between the upper slide rail assembly 200 and the lower slide rail assembly 100.

Figure 23:
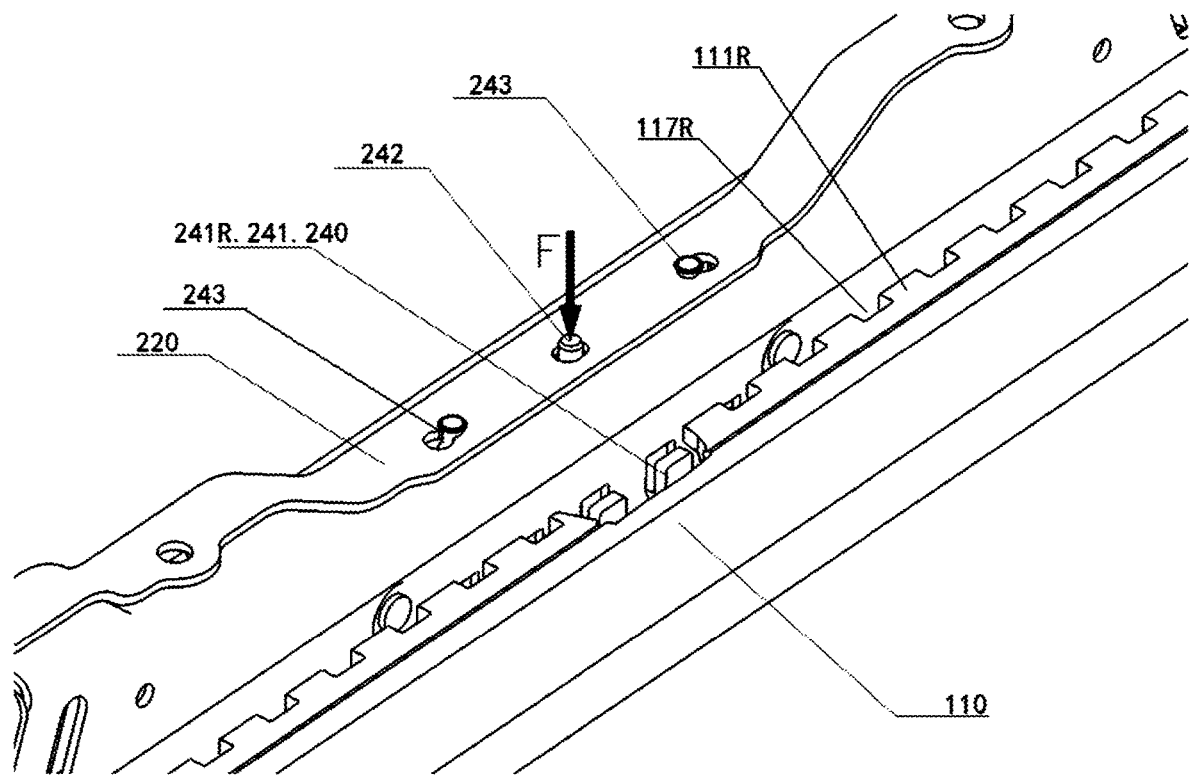
FIG. 23 is a schematic perspective view of the present invention when locking teeth on a locking plate have been completely unlocked from locking windows on an aluminum slide rail.
Figure 24:
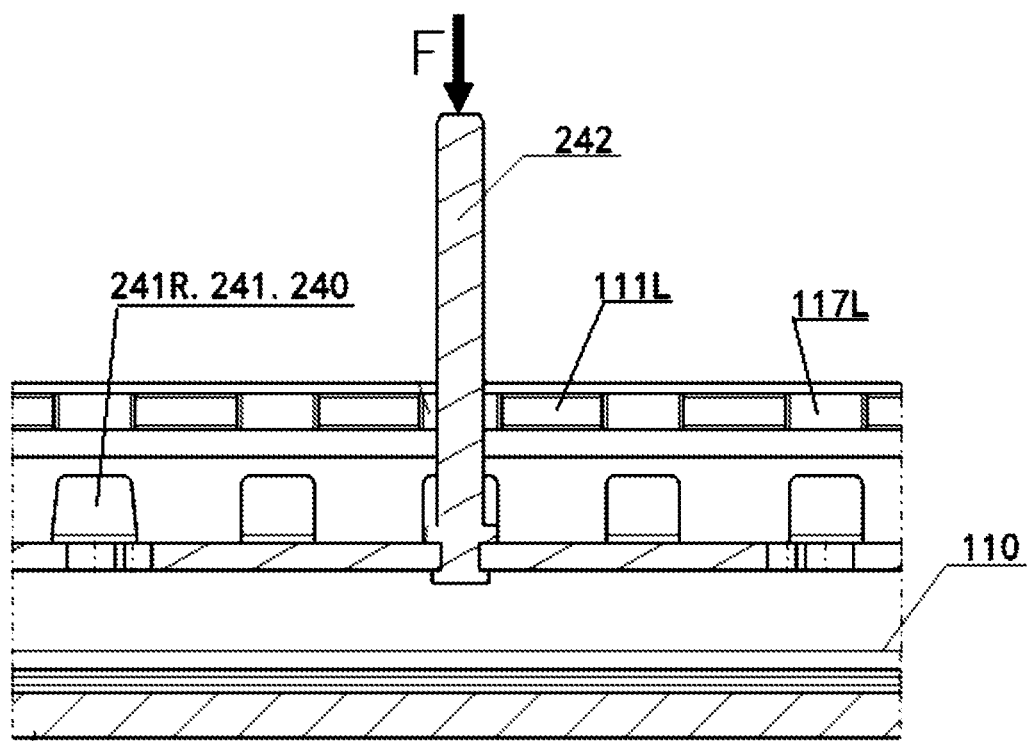
FIG. 24 is a schematic sectional view of locking teeth on a locking plate unlocked from locking windows on an aluminum slide rail in the present invention.
Figure 25:
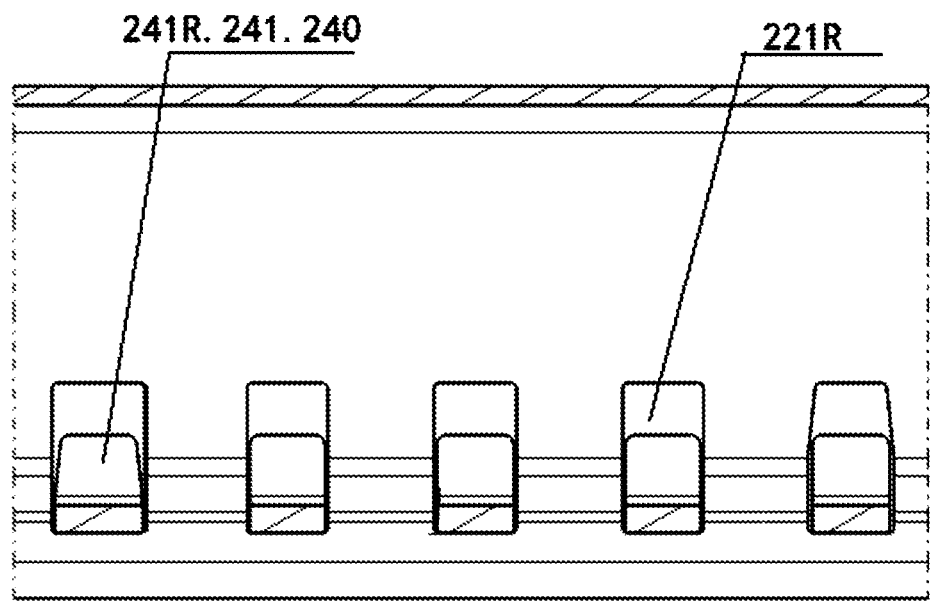
FIG. 25 is a schematic sectional view of locking teeth on a locking plate unlocked from locking windows on an upper slide rail in the present invention.

Referring to FIGS. 23 to 25 in particular, when unlocking is performed, the unlocking pin 242 is pressed down with a force F; the downward-moving unlocking pin 242 drives the locking plate 241 to move downwards, and the locking plate 241 moves downwards such that the five left locking teeth 241L and the five right locking teeth 241R on the left and right side edges of the locking plate 241 synchronously withdraw from the five corresponding left lower locking windows 117L in the left locking window face 111L and the five corresponding right lower locking windows 117R in the right locking window face 111R of the aluminum slide rail 110, to achieve unlocking of the upper slide rail assembly 200 from the lower slide rail assembly 100.

Figure 26:
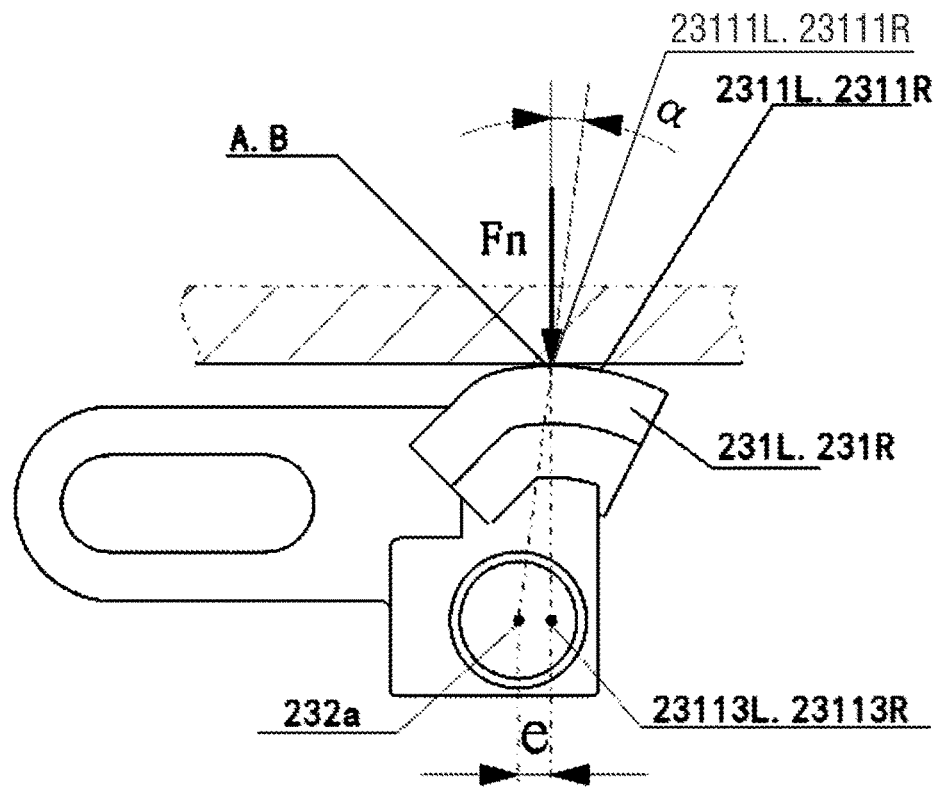
FIG. 26 is a schematic sectional view of a gap elimination cam and a gap elimination face on an aluminum slide rail of the present invention when in a state of contact.

Referring to FIG. 26, a cam face 2311L on the left gap elimination cam 231L and a cam face 2311R on the right gap elimination cam 231R in each of the two gap elimination mechanisms 230 each comprise a circular arc cam face 231111/2311R section. Circle centers 23113L and 23113R of the circular arc cam faces 23111L and 23111R are offset from a rotation center 232a of the cam frame 232 (i.e. a rotation center of the left gap elimination cam 231L and the right gap elimination cam 231R) towards the locking mechanism 240 by a distance e. A self-locking angle α is formed between a line connecting the rotation center 232a of the cam frame 232 to a point of contact A between the cam face 2311L on the left gap elimination cam 231L and the left gap elimination face 113L, and a line connecting the circle center 23113L of the circular arc cam face 23111L to the point of contact A between the cam face 2311L on the left gap elimination cam 231L and the left gap elimination face 113L.

Similarly, a self-locking angle α is formed between a line connecting the rotation center 232a of the cam frame 232 to a point of contact B between the cam face 2311R on the right gap elimination cam 231R and the right gap elimination face 113R, and a line connecting the circle center 23113R of the circular arc cam face 23111R to the point of contact B between the circular arc cam face 2311R on the right gap elimination cam 231R and the right gap elimination face 113R.

When the circular arc cam faces 23111L and 23111R on the left and right gap elimination cams 231L and 231R are in contact with the left and right gap elimination faces 113L and 113R, there is an action force Fn at the points of contact A and B; when an action of an external force such as an impact is received, Fn is increased, and due to the presence of the self-locking angle α, the left and right gap elimination cams 231L and 231R have a self-locking function, so that in theory, the circular arc cam faces 23111L and 23111R on the left and right gap elimination cams 231L and 231R will not separate from the left and right gap elimination faces 113L and 113R.

Figure 27:
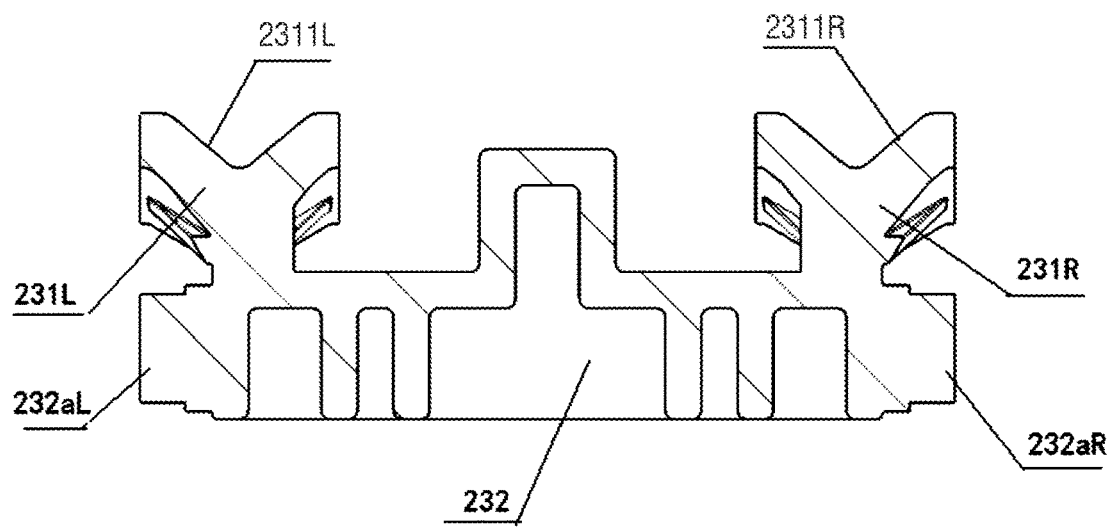
FIG. 27 is a structural schematic sectional view of one structural form of a gap elimination cam.

Referring to FIG. 27, a cross section, along the rotation center 232a parallel to the cam frame 232, of the cam face 2311L on the left gap elimination cam 231L and the cam face 2311R on the right gap elimination cam 231R is a V-shaped surface.

Figure 28:
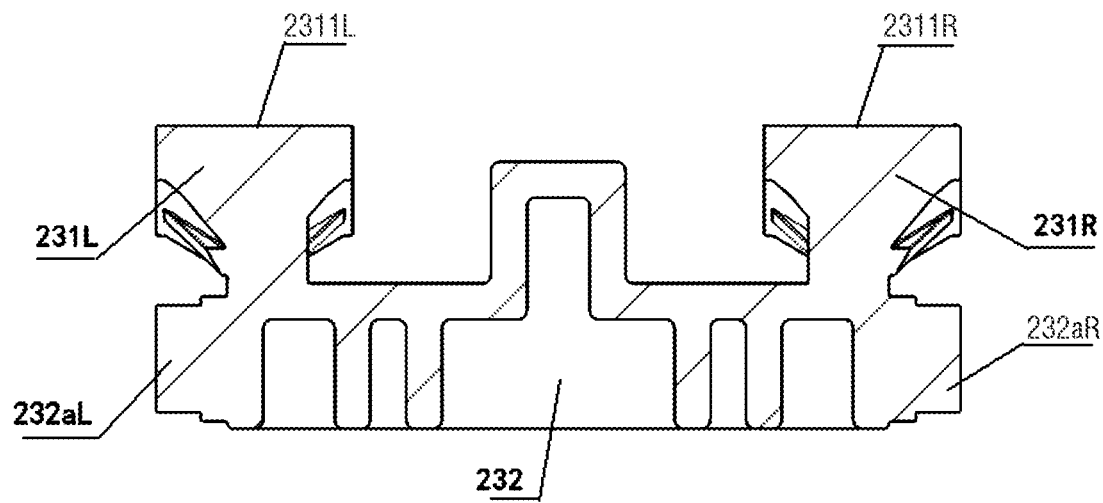
FIG. 28 is a structural schematic sectional view of another structural form of a gap elimination cam.

Referring to FIG. 28, a cross section, along the rotation center 232a parallel to the cam frame 232, of the cam face 2311L on the left gap elimination cam 231L and the cam face 2311R on the right gap elimination cam 231R is a flat surface.

Figure 29:
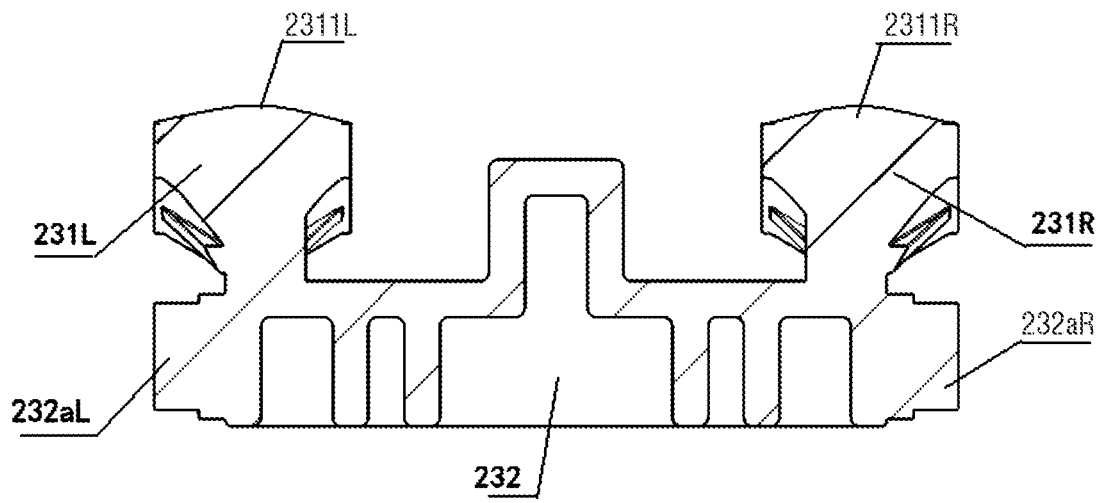
FIG. 29 is a structural schematic sectional view of another structural form of a gap elimination cam.

Referring to FIG. 29, a cross section, along the rotation center 232a parallel to the cam frame 232, of the cam face 2311L on the left gap elimination cam 231L and the cam face 2311R on the right gap elimination cam 231R is a protruding spherical surface.

Figure 30:
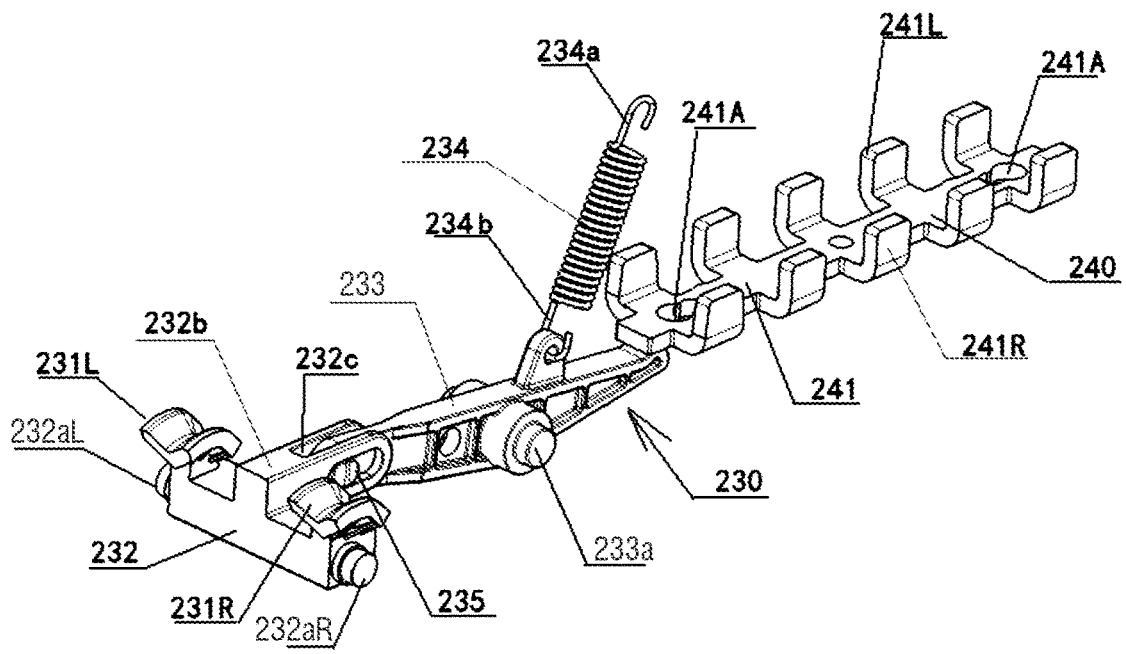
FIG. 30 is a schematic perspective view of a state of action between a gap elimination structure and a locking plate of the present invention.

Referring to FIG. 30, the swing rods 233 in the two gap elimination mechanisms 230 can have the effects of increasing a transfer stroke, increasing an angle of rotation of the left gap elimination cam 231L and the right gap elimination cam 231R and improving an operating force of the locking plate 241.

Figure 31:
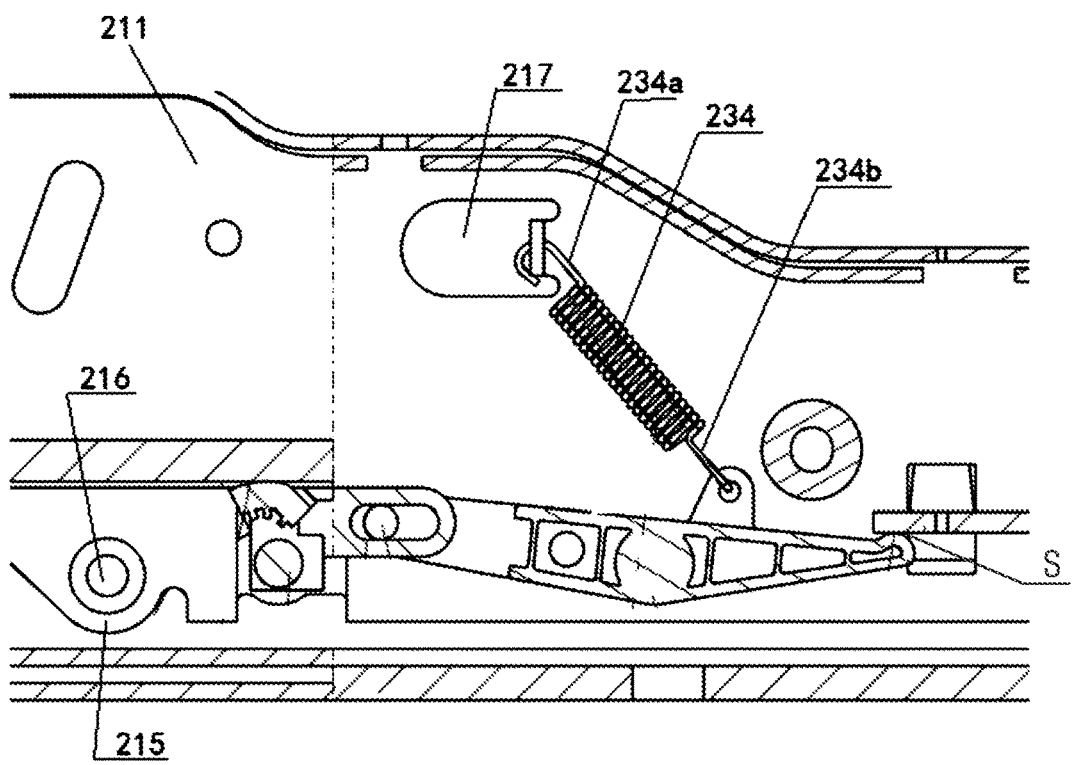
FIG. 31 is a schematic sectional view of a gap elimination structure of the present invention when in a normal gap elimination state.
Figure 32:
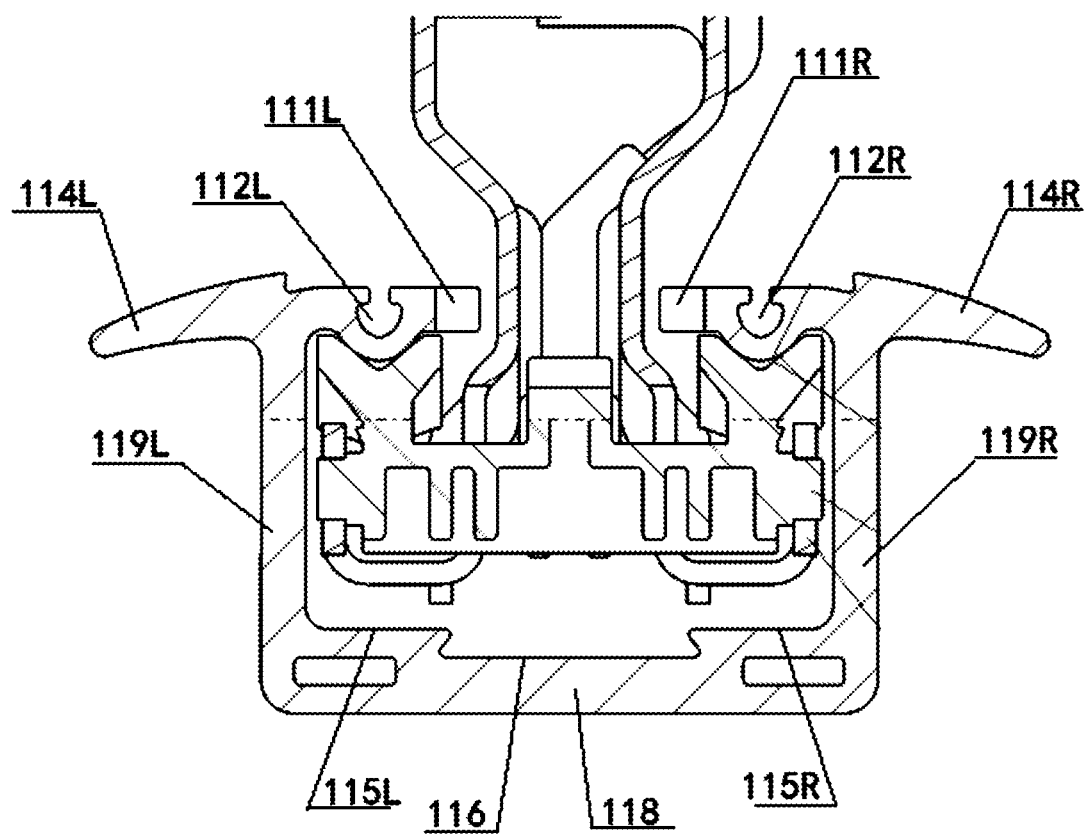
FIG. 32 is a sectional schematic view of a gap elimination structure of the present invention when in a normal gap elimination state.

Referring to FIGS. 31 and 32, in a locked stable state, under the action of the gap elimination spring 234, the swing rod 233 rotates anticlockwise around the swing rod rotation shaft 233a; the swing rod drive shaft 235 on the first end 233b of the swing rod 233 acts on the obround hole 232d in the cam drive arm 232b, and the left gap elimination cam 231L and the right gap elimination cam 231R are caused to rotate clockwise around the rotation center 232a of the cam frame 232 by means of the cam drive arm 232b and the cam frame 232, until the circular arc cam faces 23111L and 23111R on the left and right gap elimination cams 231L and 231R come into contact with the left and right gap elimination faces 113L and 113R.

At this time, since the cross section of the cam face 2311L on the left gap elimination cam 231L and the cam face 2311R on the right gap elimination cam 231R, along the rotation center 232a parallel to the cam frame 232, is a V-shaped surface, the circular arc cam faces 23111L and 23111R on the left and right gap elimination cams 231L and 231R are in sloping-line and circular-arc contact with the left and right gap elimination faces 113L and 113R. This can ensure that the upper slide rail assembly 200 is gap-free and stable in a Y-direction and a Z-direction simultaneously.

At the same time, due to the fact that the five left locking teeth 241L on the left side edge of the locking plate 241 in the locking mechanism 240 are in contact with the corresponding upper left slide rail locking windows 211L in the upper rail left side plate 211 and five corresponding left lower locking windows 117L in the left locking window face 111L of the aluminum slide rail 110, and the fact that the five right locking teeth 241R on the right side edge of the locking plate 241 in the locking mechanism 240 are in contact with the corresponding upper right slide rail locking windows 221R in the upper rail right side plate 221 and five corresponding right lower locking windows 117R in the right locking window face 111R of the aluminum slide rail 110, the upper slide rail assembly 200 and the lower slide rail assembly 100 are gap free and are stable in an X-direction.

Furthermore, due to the fact that the circle center 23113L of the circular arc cam face 23111L of the left gap elimination cam 231L and the circle center 23113R of the circular arc cam face 23111R of the right gap elimination cam 231R are both offset from the rotation center 232a of the cam frame 232 (i.e. the rotation center of the left gap elimination cam 231L and the right gap elimination cam 231R) towards the locking mechanism 240 by a distance e, due to the presence of friction, a self-locking angle α is formed between a line connecting the rotation center 232a of the cam frame 232 to a point of contact A between the cam face 2311L on the left gap elimination cam 231L and the left gap elimination face 113L, and a line connecting the circle center 23113L of the circular arc cam face 2311L to the point of contact A between the cam face 2311L on the left gap elimination cam 231L and the left gap elimination face 113L.

Similarly, a self-locking angle α is formed between a line connecting the rotation center 232a of the cam frame 232 to a point of contact B between the cam face 2311R on the right gap elimination cam 231R and the right gap elimination face 113R, and a line connecting the circle center 23113R of the circular arc cam face 2311R to the point of contact B between the cam face 2311R on the right gap elimination cam 231R and the right gap elimination face 113R, external force impacts can be resisted, preventing a situation in which the left gap elimination cam 231L and the right gap elimination cam 231R rotate anticlockwise, and separate from the left and right gap elimination faces 113L and 113R, causing the upper slide rail assembly 200 to rock.

Figure 33:
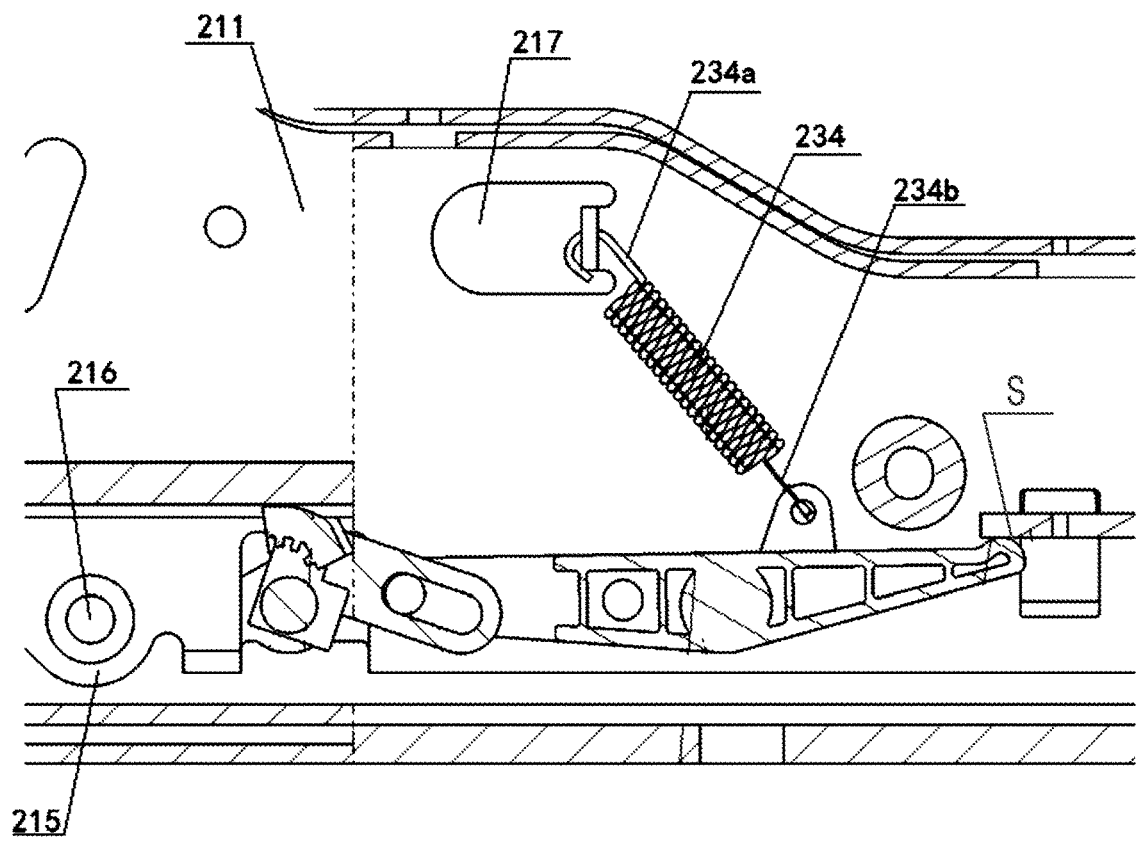
FIG. 33 is a schematic perspective view of a gap elimination structure of the present invention when in a maximum gap elimination state.
Figure 34:
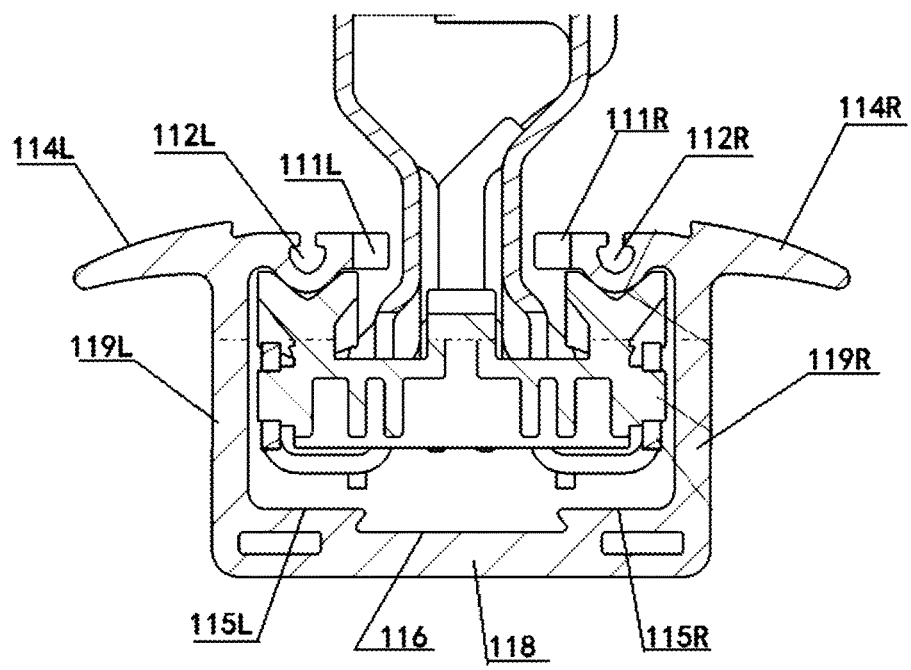
FIG. 34 is a schematic sectional view of a gap elimination structure of the present invention when in a maximum gap elimination state.

Furthermore, due to presence of a design gap S between the second end 233c of the swing rod 233 in each of the two gap elimination mechanisms 230 and the end of the locking plate 241, when there is a gap between the upper slide rail assembly 200 and the lower slide rail assembly 100, under the action of the gap elimination spring 234, the swing rod 233 rotates anticlockwise around the swing rod rotation shaft 233a, the swing rod drive shaft 235 on the first end 233b of the swing rod 233 acts on the obround hole 232d in the cam drive arm 232b, and the left gap elimination cam 231L and the right gap elimination cam 231R are caused to rotate clockwise around the rotation center 232a of the cam frame 232 by means of the cam drive arm 232b and the cam frame 232, until the circular arc cam faces 23111L and 23111R on the left and right gap elimination cams 231L and 231R come into contact with the left and right gap elimination faces 113L and 113R and eliminate the gap. When S=0, this is a state in which a maximum gap is eliminated (see FIGS. 33 and 34).

Figure 35:
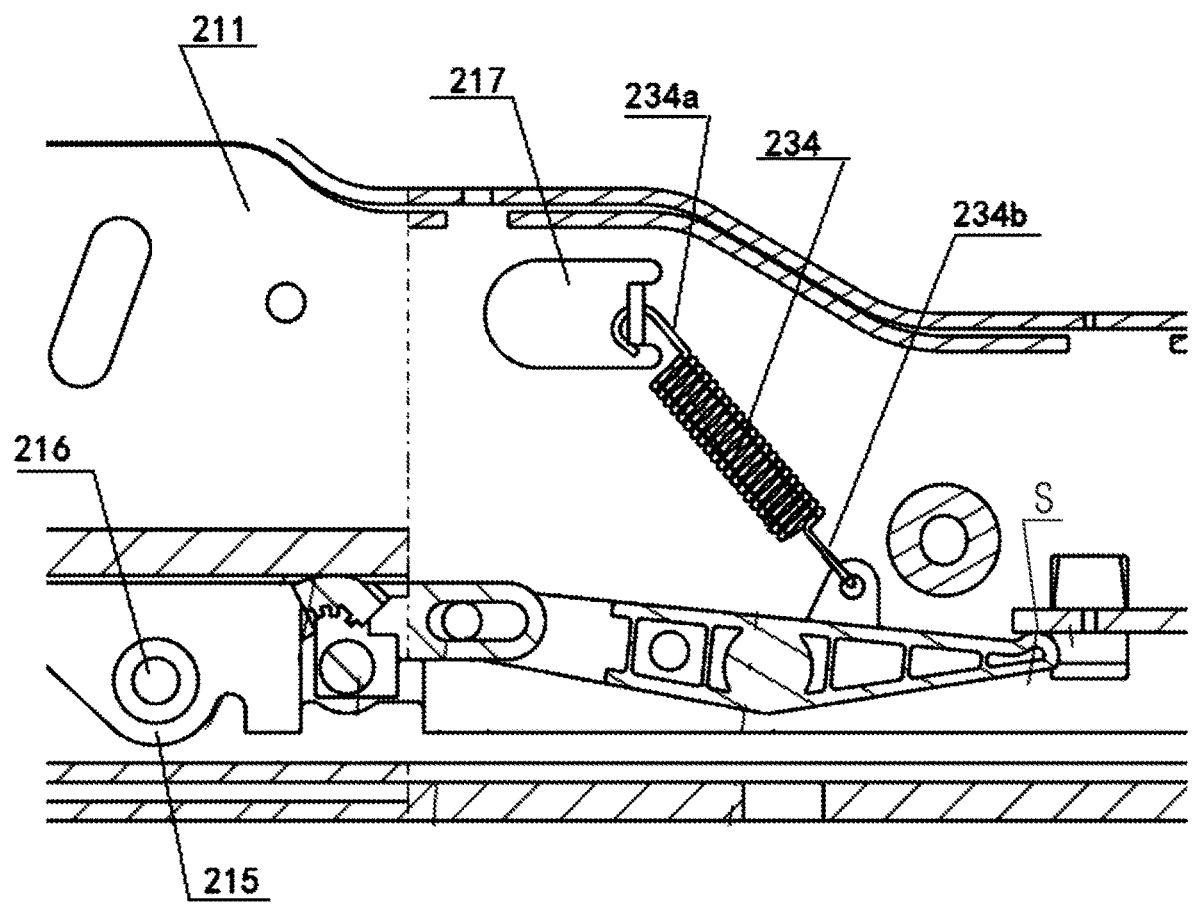
FIG. 35 is a schematic sectional view of a gap elimination structure of the present invention when in a critical gap elimination state.
Figure 36:
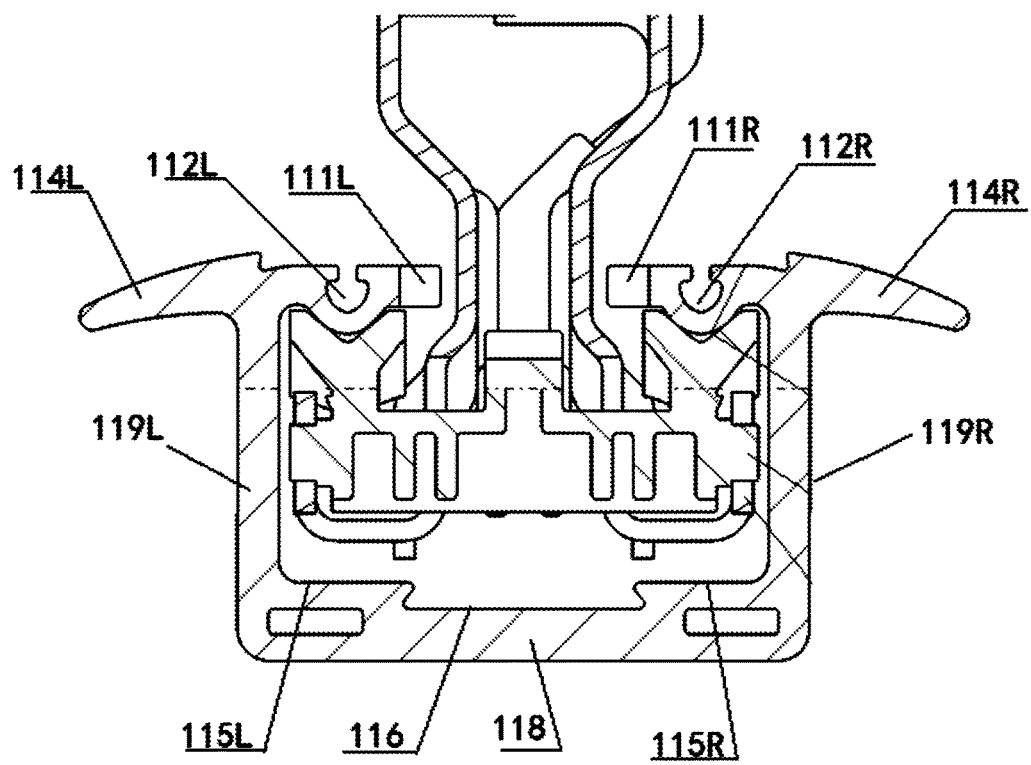
FIG. 36 is a schematic sectional view of a gap elimination structure of the present invention when in a critical gap elimination state.

Referring to FIGS. 35 and 36, when unlocking is performed, the locking plate 241 moves downward, and when the locking plate 241 comes into contact with the second ends 233c in the swing rods 233 in the two gap elimination mechanisms 230, the locking plate 241 continues to press down the second ends 233c in the swing rods 233 in the two gap elimination mechanisms 230, such that the swing rod 233 rotates clockwise, the swing rod drive shaft 235 on the first end 233b of the swing rod 233 acts on the obround hole 232d in the cam drive arm 232b, and the left gap elimination cam 231L and the right gap elimination cam 231R are caused to rotate anticlockwise around the rotation center 232a of the cam frame 232 by means of the cam drive arm 232b and the cam frame 232, such that the circular arc cam faces 23111L and 23111R on the left and right gap elimination cams 231L and 231R lose contact with the left and right gap elimination faces 113L and 113R, to facilitate sliding of the upper slide rail assembly 200.

Figure 37:
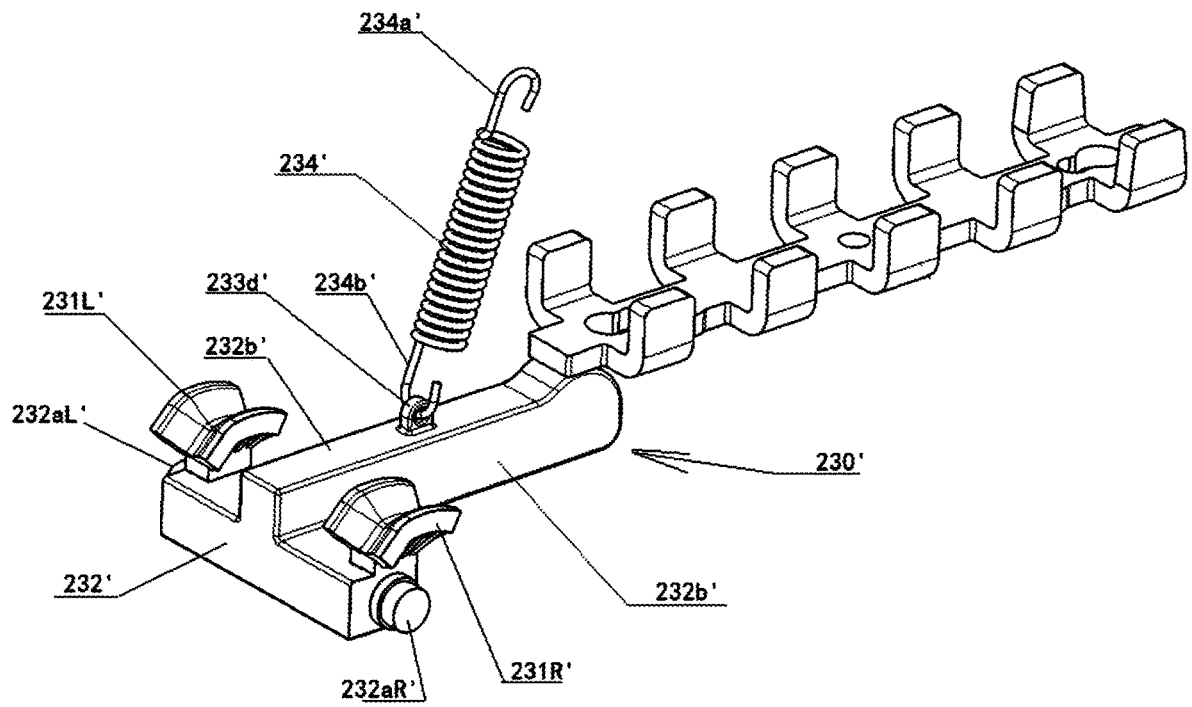
FIG. 37 is a schematic perspective view of a state of action between a gap elimination structure of another structural form and a locking plate of the present invention.

Referring to FIG. 37, in this particular embodiment, each gap elimination mechanism 230' comprises a left gap elimination cam 231L', a right gap elimination cam 231R', a cam frame 232' and a gap elimination spring 234', with the left gap elimination cam 231L' and the right gap elimination cam 231R' being disposed at left and right ends of the cam frame 232' and integrally formed with the cam frame 232'. A left cam rotation shaft 232aL' and a right cam rotation shaft 232aR' are provided on end faces at the left and right ends of the cam frame 232' respectively. A cam drive arm 232b' is provided in a middle position of the cam frame 232', with a spring hanging hole 233d' being provided on the cam drive arm 232b'.

When assembly is carried out, the left cam rotation shaft 232aL' at the left ends of the cam frames 232' in the two gap elimination mechanisms 230' are inserted into left cam rotation shaft holes 218 at the two ends of the upper rail left side plate 211 respectively.

Next, upper ends 234a' of the gap elimination springs 234' in the two gap elimination mechanisms 230' are hooked onto the two spring hanging plates 217 respectively, and lower ends 234b' of the gap elimination springs 234' are hooked into the spring hanging holes 233d' on the cam drive arms 232b' in the two gap elimination mechanisms 230'. Once the two gap elimination structures 230 have been assembled, free ends of the cam drive arms 232b' in the two gap elimination mechanisms 230 are located below the two ends in the longitudinal direction of the locking plate 241 respectively.

Next, the upper rail left side plate 211 is fitted to the upper rail right side plate 221, at the same time inserting the right locking teeth 241R on the right side edge of the locking plate 241 in the locking mechanism 240 into the corresponding upper right slide rail locking windows 221R in the upper rail right side plate 221 respectively, and inserting the right cam rotation shafts 232aR' at the right ends of the cam frames 232' in the two gap elimination mechanisms 230' into the right cam rotation shaft holes 228 at the two ends of the upper rail right side plate 221 respectively.

While specific embodiments of the invention have been shown and described in detail to illustrate the application of the principles of the invention, it will be understood that the invention may be embodied otherwise without departing from such principles.

APPENDIX

List of Reference Designations 100 lower slide rail assembly
110 aluminum slide rail
111L left locking window face
111R right locking window face
112L left soft trim strip fixing groove
112R right soft trim strip fixing groove
113L left gap elimination face
113R right gap elimination face
114L left carpet-pressing folded edge
114R right carpet-pressing folded edge
115L left bearing rolling face
115R right bearing rolling face
116 mounting face
117L lower left locking window
117R lower right locking window
118 bottom wall
119L left sidewall
119R right sidewall
120 bolt
130 washer
140 paper washer
150 locating pin
160 end stop pin
170L left soft trim strip
170R right soft trim strip
180 end cap
200 upper slide rail assembly
210 upper rail left side assembly
211 upper rail left side plate
211b unlocking pin guide hole
211c locking spring hanging hole
211L upper left slide rail locking windows
212 left welded nut
213 left reinforcing plate
214 left support plate
215 left plastic-coated bearing
216 left bearing rivet
217 spring hanging plate
218 left cam rotation shaft hole
219 left swing rod rotation shaft hole
220 upper rail right side assembly
221 upper rail right side plate
221R upper right slide rail locking windows
222/
223 right reinforcing plates
224/
225 right plastic-coated bearing
226 right bearing rivet
228 right cam rotation shaft hole
229 right swing rod rotation shaft hole
230, 230' gap elimination mechanism
231L, 231L' left gap elimination cam
231R right gap elimination cam
2311L cam face
2311R cam face
23111L circular arc cam face
23111R circular arc cam face
23113L circle center
23113R circle center
232, 232' cam frame
232a rotation center
232aL, 232aL' left cam rotation shaft
232aR, 232aR' right cam rotation shaft
232b, 232b' cam drive arm
232c U-shaped slot
232d obround hole
233 swing rod
233a swing rod rotation shaft
233b first end
233c second end
233d, 233d' spring hanging hole
234 gap elimination spring
234a upper end
234b lower end
235 swing rod drive shaft
240 locking mechanism
241 locking plate
241a locking spring hanging hole
241R right locking teeth
241L left locking teeth
242 unlocking pin
243 two locking springs
A, B point of contact
S design gap
F force
Fn action force
e distance
Angle

What is claimed is:

1. A motor vehicle seat floor slide rail comprising:
a lower slide rail assembly comprising an aluminum slide rail comprising at least one locking window face extending in a longitudinal direction of the aluminum slide rail and a plurality of lower slide rail locking windows provided at intervals on the locking window face in the longitudinal direction of the aluminum slide rail;
an upper slide rail assembly comprising an upper slide rail and a locking mechanism with a plurality of upper slide rail locking windows provided at intervals on the upper slide rail in a longitudinal direction of the upper slide rail, locking teeth on a locking plate in the locking mechanism, the locking teeth being respectively inserted into the upper slide rail locking windows and the lower slide rail locking windows, realizing locking of the upper slide rail assembly to the lower slide rail assembly and eliminating a longitudinal gap between the upper slide rail assembly and the lower slide rail assembly, wherein unlocking includes the locking teeth on the locking plate of the locking mechanism being withdraw from the lower slide rail locking windows, whereby after unlocking, the upper slide rail assembly is moveable reciprocally on the aluminum slide rail in the longitudinal direction of the upper slide rail;
at least one gap elimination mechanism comprising at least one shaft provided gap elimination cam on at least one end in the longitudinal direction of the upper slide rail, the gap elimination cam having a rotation center axis that is perpendicular to the longitudinal direction of the upper slide rail;
to eliminate a transverse gap and a vertical gap between the upper slide rail assembly and the lower slide rail assembly, the at least one gap elimination mechanism being engageable with one of ends of the locking mechanism and with the upper slide rail assembly wherein a driver drives the gap elimination mechanism to engage with the lower rail in a locked state of the rail assembly.

2. A motor vehicle seat floor slide rail according to claim 1, wherein the gap elimination mechanism is engageable with one of ends of the locking plate when the locking plate is moved downwards wherein the locking mechanism drives the gap elimination mechanism to disengage with the lower rail assembly.

3. A motor vehicle seat floor slide rail according to claim 1, further comprising at least another gap elimination mechanism wherein one gap elimination mechanism is positioned at a first end of the upper slide rail assembly and the another gap elimination mechanism is positioned at a second end of the upper slide rail assembly.

4. A motor vehicle seat floor slide rail according to claim 1, wherein a gap elimination face, extending in the longitudinal direction of the aluminum slide rail, is provided on a bottom face of the locking window face on the aluminum slide rail, and when the upper slide rail assembly and the lower slide rail assembly are in a locked state, a cam face of the gap elimination cam is in contact with the gap elimination face under the action of a force, to eliminate the transverse gap and the vertical gap between the upper slide rail assembly and the lower slide rail assembly; in an unlocked state, the locking mechanism drives an action of the gap elimination cam, such that the cam face of the gap elimination cam loses contact with the gap elimination face.

5. A motor vehicle seat floor slide rail according to claim 1, wherein:
   a cam face on the gap elimination cam has a circular arc cam face section;
   a circle center of the circular arc cam face is offset from a rotation center of the gap elimination cam towards the locking mechanism; and
   a self-locking angle is formed between a line connecting the rotation center of the gap elimination cam to a point of contact between the cam face and the gap elimination face and a line connecting the circle center of the circular arc cam face to the point of contact between the cam face and the gap elimination face.

6. A motor vehicle seat floor slide rail according to claim 1, wherein a cross section, along the rotation center axis parallel to the gap elimination cam, of a cam face on the gap elimination cam, is a V-shaped surface or a flat surface or a protruding spherical surface.

7. A motor vehicle seat floor slide rail according to claim 1, wherein:
   the gap elimination mechanism further comprises a cam frame and a gap elimination spring;
   the gap elimination cam is mounted on the cam frame;
   the cam frame is shaft-provided on at least one end in the longitudinal direction of the upper slide rail; and
   a rotation center of the cam frame coincides with the rotation center of the gap elimination cam;
   the cam frame has a cam drive arm extending towards the locking mechanism, and an end of the cam drive arm adjacent to the locking mechanism extends to a region below the locking plate in the locking mechanism,
   with unlocking, the locking plate in the locking mechanism, when moving downwards, driving the end of the cam drive arm close to the locking mechanism to move downwards, is such that the cam face of the gap elimination cam loses contact with the gap elimination face, the cam drive arm is connected to the upper slide rail by means of the gap elimination spring, and the gap elimination spring applies the force to the cam face of the gap elimination cam by the cam drive arm, such that the cam face of the gap elimination cam is in contact with the gap elimination face.

8. A motor vehicle seat floor slide rail according to claim 1, wherein the gap elimination mechanism further comprises:
   a cam frame;
   a gap elimination spring; and
   a swing rod, wherein:
   the gap elimination cam is mounted on the cam frame; the cam frame is shaft-provided on at least one end in the longitudinal direction of the upper slide rail;
   a rotation center of the cam frame coincides with the rotation center of the gap elimination cam;
   the cam frame has a cam drive arm extending towards the locking mechanism, and the cam drive arm is provided with an obround hole;
   the swing rod is shaft-provided on the upper slide rail and positioned between the cam drive arm and one end of the locking plate in the locking mechanism;
   a swing rod drive shaft is provided on the end of the swing rod close to the cam drive arm, with the swing rod drive shaft extending into the obround hole of the cam drive arm; and
   an end of the swing rod adjacent to the locking mechanism extends to a region below the locking plate in the locking mechanism,
   with unlocking, the locking plate in the locking mechanism, when moving downwards, drives the end of the swing rod adjacent to the locking mechanism to move downwards, such that the end of the swing rod adjacent to the cam drive arm moves upwards, in turn causing the cam face of the gap elimination cam to lose contact with the gap elimination face by means of the cam drive arm, the swing rod is connected to the upper slide rail by the gap elimination spring, and the gap elimination spring applies force to the cam face of the gap elimination cam by the swing rod and the cam drive arm, such that the cam face of the gap elimination cam is in contact with the gap elimination face; compared with a position where the swing rod is shaft-provided on the upper slide rail, a position where the gap elimination spring is connected to the swing rod is closer to the locking mechanism.

* * * * *